(12) United States Patent
Yang et al.

(10) Patent No.: US 12,382,349 B2
(45) Date of Patent: Aug. 5, 2025

(54) DATA TRANSMISSION METHOD, COMMUNICATIONS DEVICE, AND COMMUNICATIONS SYSTEM FOR DETERMINING VALIDITY OF SYSTEM INFORMATION VALIDITY

(71) Applicant: HUAWEI TECHNOLOGIES CO., LTD., Guangdong (CN)

(72) Inventors: Chenchen Yang, Ottawa (CA); Yinghao Jin, Paris (FR); Wei Tan, Shanghai (CN); Feng Han, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/722,119

(22) Filed: Apr. 15, 2022

(65) Prior Publication Data
US 2022/0240131 A1   Jul. 28, 2022

Related U.S. Application Data

(63) Continuation of application No. PCT/CN2020/113874, filed on Sep. 8, 2020.

(30) Foreign Application Priority Data

Oct. 17, 2019   (CN) .......................... 201910989483.5

(51) Int. Cl.
*H04W 36/00*   (2009.01)
*H04W 76/12*   (2018.01)
*H04W 84/04*   (2009.01)

(52) U.S. Cl.
CPC ....... *H04W 36/0022* (2013.01); *H04W 76/12* (2018.02); *H04W 84/042* (2013.01)

(58) Field of Classification Search
CPC ... H04W 48/18; H04W 84/042; H04W 48/10; H04W 36/0022; H04W 76/12;
(Continued)

(56) References Cited

U.S. PATENT DOCUMENTS

| | | | |
|---|---|---|---|
| 2006/0166693 A1* | 7/2006 | Jeong | H04W 36/0055 455/525 |
| 2011/0269460 A1* | 11/2011 | Dalsgaard | H04W 48/10 455/435.1 |

(Continued)

FOREIGN PATENT DOCUMENTS

| | | |
|---|---|---|
| CN | 105580399 A | 5/2016 |
| CN | 104160745 B | 5/2018 |

(Continued)

OTHER PUBLICATIONS

Intel Corporation, Data Forwarding in intra-system Xn HO. 3GPP TSG RAN WG3 Meeting #98, Reno, Nevada, USA, Nov. 27-Dec. 1, 2017, R3-174636, 4 pages.
3GPP TS 38.423 V15.5.0 (Sep. 2019), 3rd Generation Partnership Project; Technical Specification Group Radio Access Network; NG-RAN; Xn application protocol (XnAP)(Release 15), 311 pages.
(Continued)

*Primary Examiner* — Allahyar Kasraian

(57) ABSTRACT

A data transmission method, a communications device, and a communications system are provided for wireless communications. A terminal device receives a first system information broadcast by a radio access network device. The first system information includes a non-public network (NPN), identification information list and a first association information. The NPN identification information list includes at least one NPN identification information and determines a second system information is valid when first NPN identification information in the NPN identification information list is identical to second NPN identification information stored in the terminal device, and the first association information is identical to a second association information stored in the terminal device. The second system informa- (Continued)

tion can include the second NPN identification information and the second association information.

12 Claims, 18 Drawing Sheets

(58) Field of Classification Search
CPC ..... H04W 76/27; H04W 76/19; H04W 12/76; H04W 36/14; H04W 76/10
See application file for complete search history.

(56) References Cited

U.S. PATENT DOCUMENTS

| | | | |
|---|---|---|---|
| 2019/0098537 | A1 | 3/2019 | Qiao et al. |
| 2019/0104447 | A1 | 4/2019 | Horn et al. |
| 2020/0389835 | A1* | 12/2020 | Talebi Fard .......... H04W 48/06 |
| 2021/0099924 | A1* | 4/2021 | Shih ................ H04W 36/0061 |
| 2021/0306869 | A1* | 9/2021 | Wei ...................... H04W 16/28 |
| 2022/0132348 | A1* | 4/2022 | Orsino ................ H04W 76/27 |
| 2023/0345351 | A1* | 10/2023 | Lindheimer .......... H04W 12/08 |

FOREIGN PATENT DOCUMENTS

| | | |
|---|---|---|
| CN | 108990116 A | 12/2018 |
| CN | 109429232 A | 3/2019 |
| CN | 109982360 A | 7/2019 |
| CN | 110086652 A | 8/2019 |
| CN | 110167093 A | 8/2019 |
| JP | 2010505329 A | 2/2010 |
| JP | 2021509231 A | 3/2021 |
| WO | 2018089879 A1 | 5/2018 |
| WO | 2018148893 A1 | 8/2018 |
| WO | 2019133049 A1 | 7/2019 |
| WO | 2021101706 A1 | 5/2021 |
| WO | 2021161265 A1 | 8/2021 |

OTHER PUBLICATIONS

Ericsson: "Discussion on SA2 LS on RAN sharing and Emergency services with Non-Public Networks", 3GPP Draft; R2-1908979, (Aug. 15, 2019), XP051766795 ,total 5 pages.
Huawei et al: "Considerations on SI Validity Checking", 3GPP Draft; R2-1915959, (Nov. 8, 2019), XP051817517 , total 3 pages.
Huawei, Handover for public network integrated NPN. 3GPP TSG-RAN3 Meeting #105, Ljubljana, Slovenia, Aug. 26-30, 2019, R3-194419, 3 pages.
Huawei, HiSilicon, Discussion on handover cases. 3GPP TSG-RAN WG2 Meeting#107, Prague, Czech Republic Aug. 26-30, 2019, R2-1911055, 5 pages.
Huawei, Discussion on RRC configuration for PLMN and NPN with RAN sharing. 3GPP TSG-RAN WG2 Meeting#107, Prague, Czech Republic Aug. 26-30, 2019, R2-1911057, 3 pages.
Huawei, CR to TS 38.423 on support of NPN. 3GPP TSG-RAN WG3 Meeting #105, Ljubljana, Slovenia, Aug. 26-30, 2019, R3-194415, 24 pages.
Ericsson, Further aspects of SNPN. 3GPP TSG-RAN WG2 #107bis, Chongqing, P.R. China, 14th Oct. 18, 2019, R2-1912360, 12 pages.
ZTE, Discussion on IAB topology adaptation. 3GPP TSG-RAN WG2 NR AdHoc 1807, Montreal, Canada, 2nd Jul. 6, 2018, R2-1810211, 4 pages.
3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.
NTT Docomo, Inc., Discussion on enhancements to support NR backhaul links. 3GPP TSG RAN WG1 Meeting #95 , Spokane, USA, Nov. 12 16, 2018, R1-1813316, 10 pages.
3GPP TSG-RAN WG3 #105bis R3-195606"Consideration on NPN paging",ZTE, Chongqing,China, Oct. 14-18, 2019, total 2 pages.
3GPP TSG-RAN WG2 Meeting #107bis R2-1913633"Report for email discussion [107#40][NR/NPN] SIB1 design (Qualcomm) ", Qualcomm Incorporated (rapporteur), Chongqing, China, Oct. 14-18, 2019, total 30 pages.

* cited by examiner

DATA TRANSMISSION METHOD, COMMUNICATIONS DEVICE, AND COMMUNICATIONS SYSTEM FOR DETERMINING VALIDITY OF SYSTEM INFORMATION VALIDITY

CROSS-REFERENCE TO RELATED APPLICATIONS

This application is a continuation of International Application No. PCT/CN2020/113874, filed on Sep. 8, 2020, which claims priority to Chinese Patent Application No. 201910989483.5, filed on Oct. 17, 2019. The disclosures of the aforementioned applications are hereby incorporated by reference in their entireties.

TECHNICAL FIELD

Embodiments of this disclosure relate to the field of communications technologies, and more particularly, to a data transmission method, a communications device, and a communications system.

BACKGROUND

A non-public network (NPN) or a private network is a network that is being discussed in a $5^{th}$ generation (5G) mobile communications standard of the $3^{rd}$ generation partnership project (3GPP). Different from a conventional cellular network, the NPN only allows access of some users with specific rights. NPNs are classified into standalone NPNs (SNPN) and non-standalone NPNs. The non-standalone NPN is also referred to as a public network integrated NPN (PNI-NPN). In the standalone NPN, an NPN and a public land mobile network (PLMN) each have a standalone radio access network (RAN) and a standalone core network (CN). Network elements are connected between the core network of the NPN and the core network of the PLMN by using a non-3GPP interworking function (N3IWF). Specifically, the N3IWF may be used to implement networking between user planes of the standalone NPN and the PLMN and between control planes of the standalone NPN and the PLMN.

Because of mobility of user equipment (UE), there is a scenario in which a terminal device is handed over between networks. For example, the terminal device is initially located in an original network, and then moves to a target network. To ensure continuity of a protocol data unit (PDU) session in the target network, after the terminal device is handed over to the target network, a PDU session in the target network needs to be re-established.

In addition, to configure cells of different networks in one access network, currently, a shared-access network is used in a communications system. A terminal device may access different networks through one shared-access network, for example, may access networks having different PLMN identifiers (ID). However, in a standalone NPN scenario and a shared-access network scenario, how to forward data of an original network to a target network on a basis of a relatively small quantity of packet losses or even no packet loss when a terminal device moves from a cell of the original network to a cell of the target network becomes a research direction that attracts much attention.

SUMMARY

Embodiments of this disclosure provide a data transmission method, a communications device, and a communications system, to resolve a problem of service discontinuity caused by a severe packet loss in a data forwarding process between different networks in a shared-access network scenario.

In accordance with a first aspect, a system information validity verification method is provided. A terminal device receives first system information broadcast by a radio access network device. The first system information includes a non-public network (NPN) identification information list and first association information. The NPN identification information list includes at least one NPN identification information. The terminal device determines second system information is valid when first NPN identification information in the NPN identification information list is identical to second NPN identification information stored in the terminal device, and the first association information is identical to second association information stored in the terminal device, the second system information comprising the second NPN identification information and the second association information. In an implementation of the first aspect, the NPN identification information includes a public land mobile network (PLMN) identifier (ID) and one of a network ID (MD) or a closed access group (CAG) ID. In a further implementation of the first aspect, the first association information and the second association information each include at least one of the following items: area scope, or system information area ID, or value tag, or cell identity.

A second aspect provides a terminal device having at least one processor and memory configured to store a computer program that, when executed by the at least one processor, causes the terminal device to receive first system information broadcast by a radio access network device, the first system information including a non-public network (NPN) identification information list and first association information, the NPN identification information list including at least one NPN identification information, and to determine a second system information is valid when first NPN identification information in the NPN identification information list is identical to second NPN identification information stored in the terminal device, and the first association information is identical to second association information stored in the terminal device, the second system information comprising the second NPN identification information and the second association information. In an implementation of the second aspect, the NPN identification information includes a public land mobile network (PLMN) identifier (ID) and one of a network ID (NID) or a closed access group (CAG) ID. In a further implementation of the second aspect, the first association information and the second association information each include at least one of the following items: area scope, or system information area ID, or value tag, or cell identity.

A third aspect provides computer-readable medium storing computer instructions that are configured, when executed by one or more processors of a terminal device, to cause the one or more processors to perform operations that cause the terminal device to receive first system information broadcast by a radio access network device, the first system information including a non-public network (NPN) identification information list and first association information, the NPN identification information list including at least one NPN identification information, and to determine second system information is valid when first NPN identification information in the NPN identification information list is identical to second NPN identification information stored in the terminal device, the first association information being identical to second association information stored in the terminal device, the second system information including the second NPN identification information and the second association information. In an implementation of the third aspect, the NPN identification information includes a public land mobile network (PLMN) identifier (ID) and one of a network ID (NID) or a closed access group (CAG) ID. In a further implementation of the third aspect, the first association information and the second association information each include at least one of the following items: area scope, or system information area ID, or value tag, or cell identity.

DESCRIPTION OF EMBODIMENTS

The following clearly describes technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the embodiments of this application, a terminal device (or terminal equipment) may also be referred to as user equipment (UE), a mobile station (MS), a mobile terminal, a station (STA), or the like. The terminal device may communicate with one or more core networks by using a radio access network (RAN). For example, the terminal device may be a mobile phone (or referred to as a "cellular" phone) or a computer having a mobile terminal. For example, the terminal device may be a portable, pocket-sized, handheld, computer built-in, or vehicle-mounted mobile apparatus, a terminal device in a 5G network, or a terminal device in a future evolved PLMN.

In the embodiments of this application, a first network may also be referred to as a source network or an original network, and is a network corresponding to a cell in which the terminal device is located before the terminal device moves. For example, the first network may be a non-public network (NPN). A second network may also be referred to as a target network, and is a network corresponding to a cell in which the terminal device is located after the terminal device moves. For example, the second network may be a public land mobile network (PLMN). In addition, movement of the terminal device in this embodiment of this application may be a handover of the terminal device from a cell of the first network to a cell of the second network or reselection of the terminal device from a cell of the first network in which the terminal device is previously located to a cell of the second network.

For ease of understanding, an NPN service and a PLMN service that are related to the embodiments of this application are first briefly described in this application.

The NPN is a network that is being discussed in a $5^{th}$ generation (5G) wireless communications standard of the $3^{rd}$ generation partnership project (3GPP). Different from a conventional cellar network, the NPN only allows access of some users with specific rights. The NPNs are classified into standalone NPNs and non-standalone NPNs. The embodiments of this application are related only to the standalone NPNs.

Figure 1:
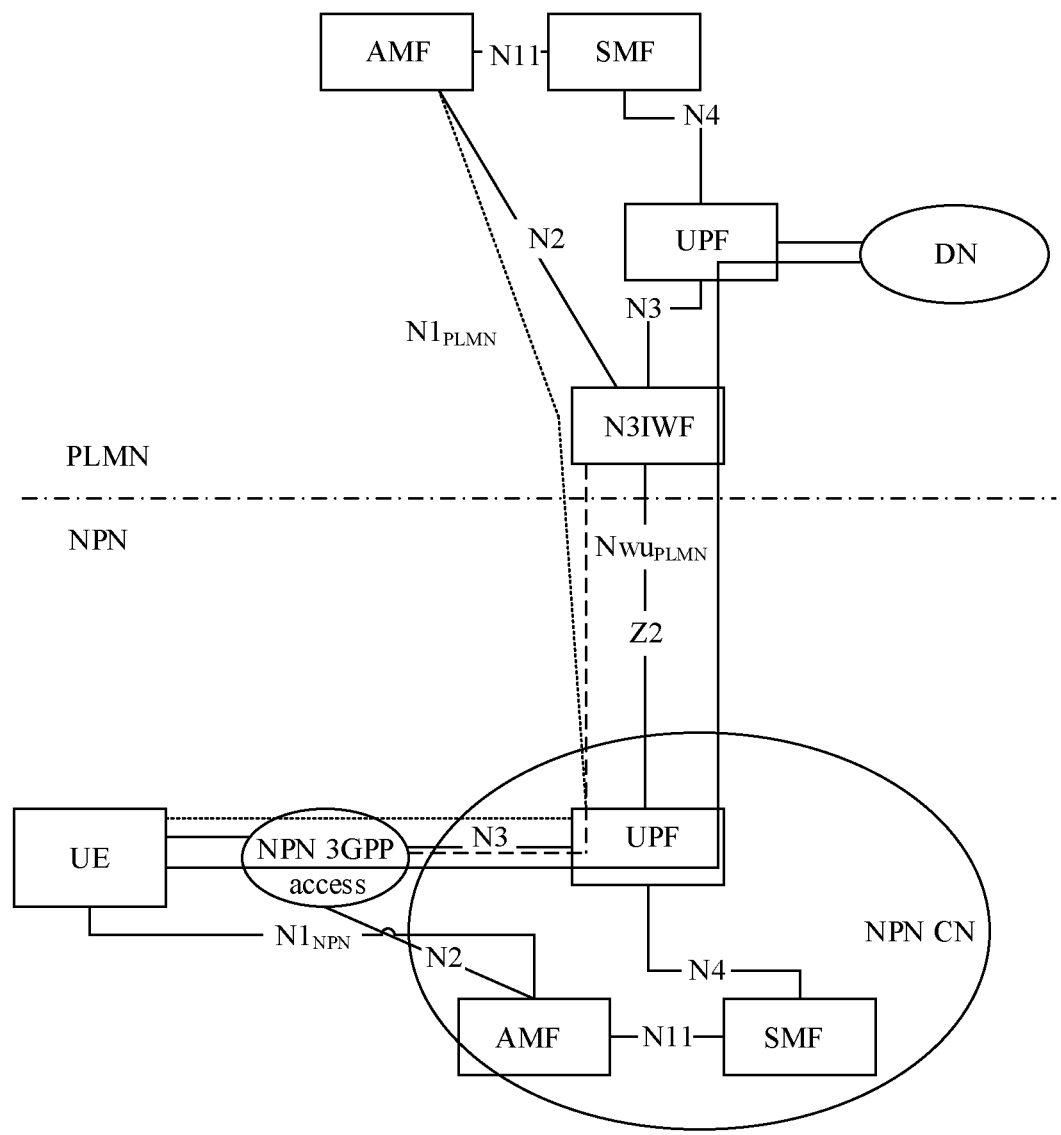
FIG. 1 is a schematic diagram of a network architecture for providing a PLMN service for a terminal device by using an NPN.

FIG. 1 is a schematic diagram of a standalone network.

In a standalone NPN, an NPN and a PLMN each have a standalone radio access network and a standalone core network (CN). The standalone NPN is considered as a non-3GPP network. Therefore, core networks of the NPN and the PLMN may be connected to each other by using a non-3GPP interworking function (N3IWF) network element, and user plane interworking and control plane interworking may be implemented by using the N3IWF network element.

Figure 2:
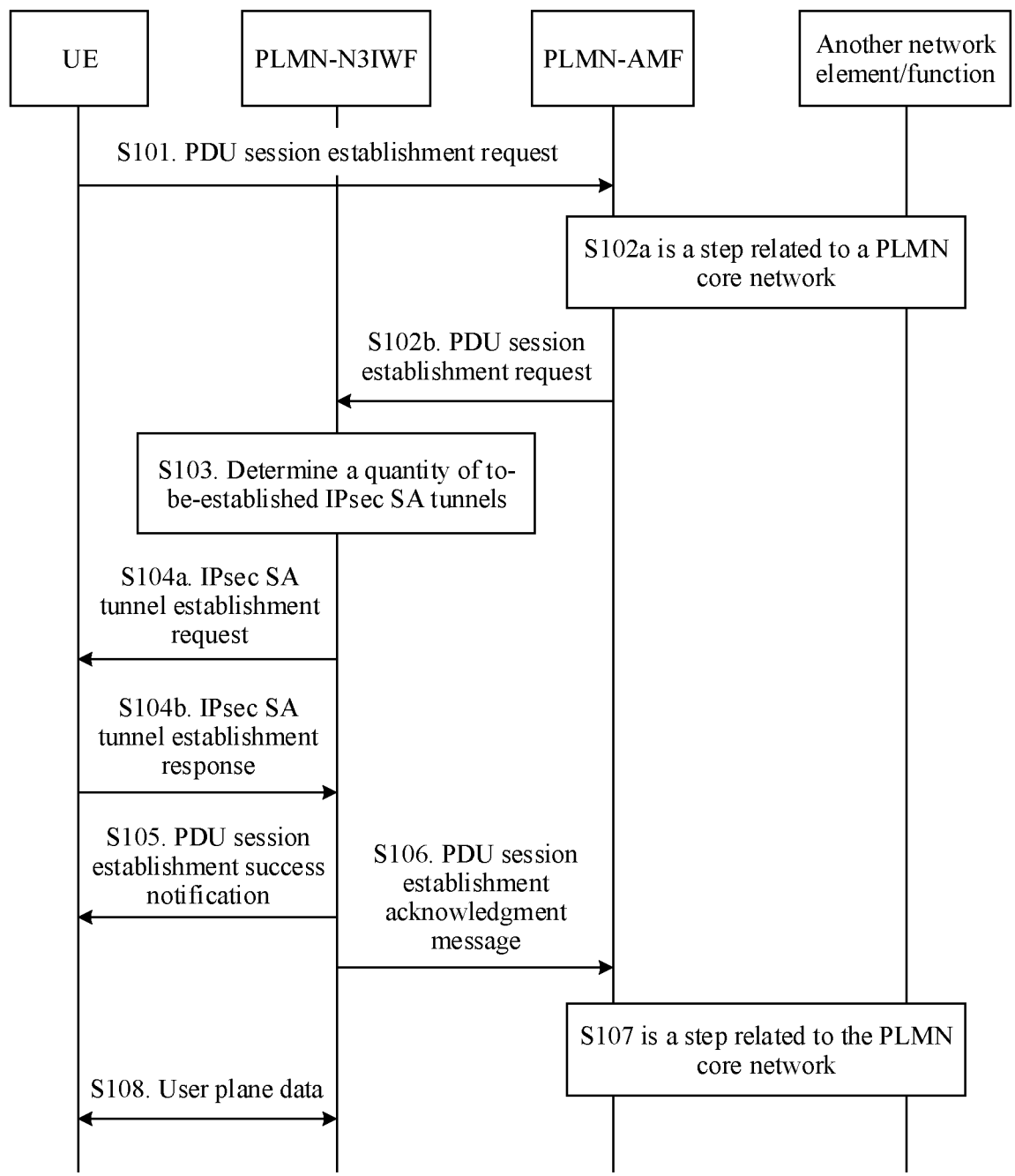
FIG. 2 is a schematic flowchart of setting up a PLMN PDU session resource for a terminal device by using an NPN.

FIG. 2 is a schematic flowchart of setting up a PLMN PDU session resource for a terminal device by using an NPN.

Setting up the PLMN PDU session resource for the terminal device by using the NPN may also be referred to as providing a PLMN service for the terminal device by using the NPN. This is a process of setting up a PLMN PDU session resource for a terminal device in the NPN. A PDU session resource setup process is a process of configuring wireless and wired resources for data transmission on a user plane. PDU session establishment involves a plurality of network elements between a user and a data network (DN), for example, an access and mobility management function (AMF), a session management function (SMF), and a user plane function (UPF). The PDU session resource setup process is an end-to-end configuration process.

With reference to FIG. 2, it can be learned that a process of setting up a PLMN PDU session resource for a terminal device by using an NPN may include the following content.

S101. The terminal device sends a PDU session establishment request message to a PLMN-AMF.

Before sending the PDU session establishment request message to the PLMN-AMF, the terminal device may first establish, with a PLMN-N3IWF, an internet protocol security (IPsec) security association (SA) tunnel for control signaling transmission. The terminal device sends non-access stratum (NAS) signaling to the PLMN-AMF by using an NPN-3GPP access device (such as a base station) and the PLMN-N3IWF, to request to set up a PDU session resource of a PLMN. The NAS signaling may carry information such as a PDU session identifier (ID).

S102a is a related setup operation of a control plane and a user plane between related network elements of the PLMN-AMF and a PLMN core network. For the related setup operation of the control plane and the user plane, refer to an existing procedure. Details are not described herein.

S102b. The PLMN-AMF sends the PDU session establishment request message to the PLMN-N3IWF.

The PLMN-AMF may send a PDU session establishment request message to the PLMN-N3IWF, and the message may further include information such as a PDU session ID, quality of service (QoS) flow related information included in a PDU session, and a QoS flow identifier (QFI).

S103. The PLMN-N3IWF determines a quantity of to-be-established IPsec SA tunnels.

The PLMN-N3IWF determines, based on a quantity of QoS flows of the PDU session that needs to be established in operation 102, the quantity of IPsec SA tunnels that need to be established for user plane data transmission. For example, if the PLMN-N3IWF determines to establish an IPsec SA tunnel for user plane data transmission for a PDU session, all QoS flows of the PDU session in operation 102 are bound to the IPsec SA tunnel. During the bounding, data is sent through the IPsec SA tunnel.

S104a. The PLMN-N3IWF sends an IPsec SA tunnel establishment request to the terminal device.

An IPsec SA tunnel is established between the PLMN-N3IWF and the terminal device. The PLMN-N3IWF may send an IPsec SA tunnel establishment request message to the terminal device, and the request message may be used to indicate that the IPsec SA tunnel established by the terminal device may be configured to send any one or more of the following information: (a) a PDU session ID, (b) a QoS flow identifier, (c) a differentiated services code point (differentiated services code point, DSCP) value, and the like. It should be understood that, if the PLMN-N3IWF notifies the terminal device of the DSCP value, each IP packet transmitted between the terminal device and the PLMN-N3IWF subsequently needs to carry a corresponding DSCP value. The DSCP is used to ensure QoS of communication, and is encoded in an identifier byte of an IP header of a data packet, to identify a service type and a priority of a service.

S104b. The terminal device sends an IPsec SA tunnel establishment response to the PLMN-N3IWF.

S105. The PLMN-N3IWF may send a PDU session establishment success notification to the terminal device, to indicate that the PDU session is successfully established.

S106. The PLMN-N3IWF sends a PDU session establishment acknowledgment message such as an N2 PDU session request ACK to the PLMN-AMF, to indicate that the PDU session is successfully established.

S107 is a related setup operation of a control plane and a user plane between related network elements of the PLMN-AMF and the PLMN core network. For a setup process of the control plane and the user plane, refer to an existing procedure. Details are not described herein.

S108. The PLMN-N3IWF performs user plane data transmission with the terminal device.

When the terminal device needs to transmit an uplink (UL) PDU session to the PLMN-N3IWF through the IPsec SA tunnel, a UL PDU packet needs to carry QFI information. When the PLMN-N3IWF receives downlink (DL) PDU data from a PLMN core network element, a UPF, the PLMN-N3IWF determines, by using the PDU ID and the QFI, an IPsec tunnel to be used for transmission to the terminal device, and adds the QFI in a to-be-transmitted DL PDU packet.

Figure 3:
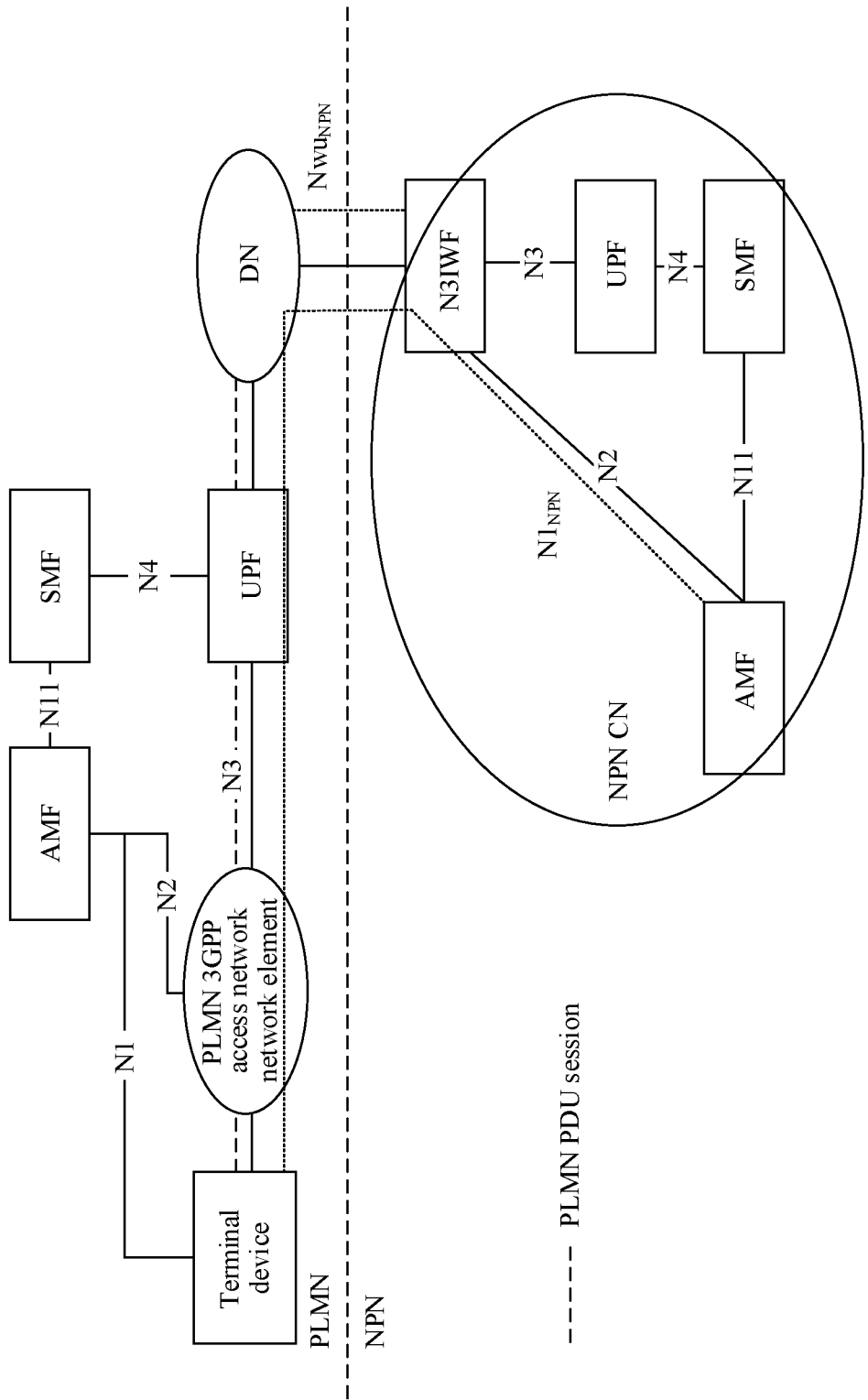
FIG. 3 is a schematic diagram of a network architecture for providing a PLMN service for a terminal device by using a PLMN.

With reference to FIG. 3, the following describes a process of providing a PLMN service for a terminal device by using a PLMN.

FIG. 3 is a schematic diagram of a network architecture for setting up a PLMN PDU session resource for a terminal device by using a PLMN.

That the PLMN service is provided for the terminal device by using the PLMN means that the terminal device is located in the PLMN and the PLMN PDU session resource is set up for the terminal device. A process of providing an NPN service for the terminal device by using an NPN (that is, the terminal device is located in the NPN and an NPN PDU session resource is set up for the terminal device) is similar to the process of providing the PLMN service for the terminal device by using the PLMN, and details are not described herein again.

The process of providing the PLMN service for the terminal device by using the PLMN may be: When the terminal device is located in a cell of the PLMN, a wireless resource (such as a DRB) set up for a PLMN PDU session of the terminal device is carried on an access network device (such as a PLMN NG-RAN) of the PLMN, and a wired resource (a data transmission tunnel of a core network) is carried on a core network device (such as a UPF) of the PLMN. In this case, the process of configuring the PLMN PDU session resource for the terminal device is the same as a conventional process of establishing a PDU session resource. Details are not described herein.

Figure 4:
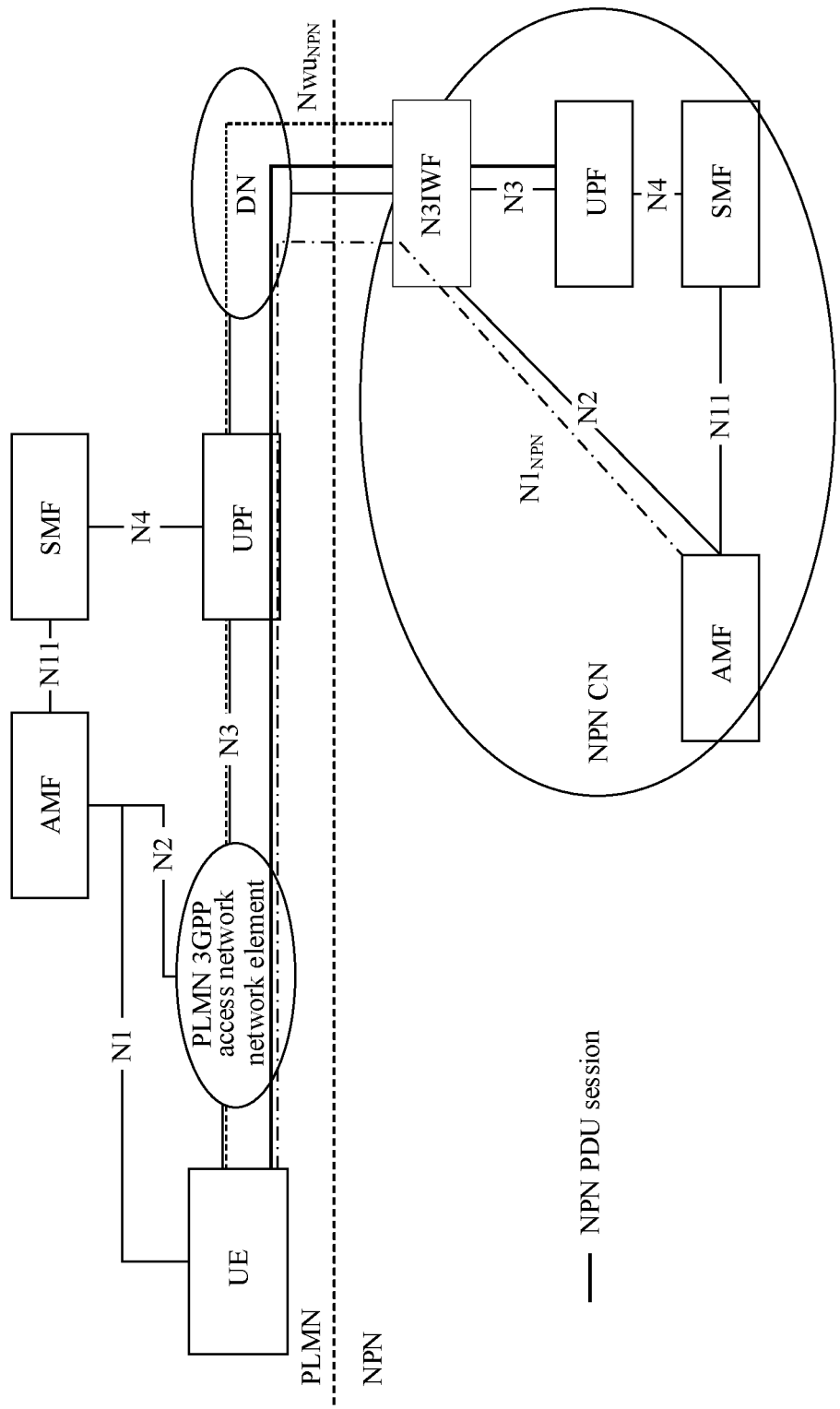
FIG. 4 is a schematic diagram of a network architecture for providing an NPN service for a terminal device by using a PLMN.
Figure 5:
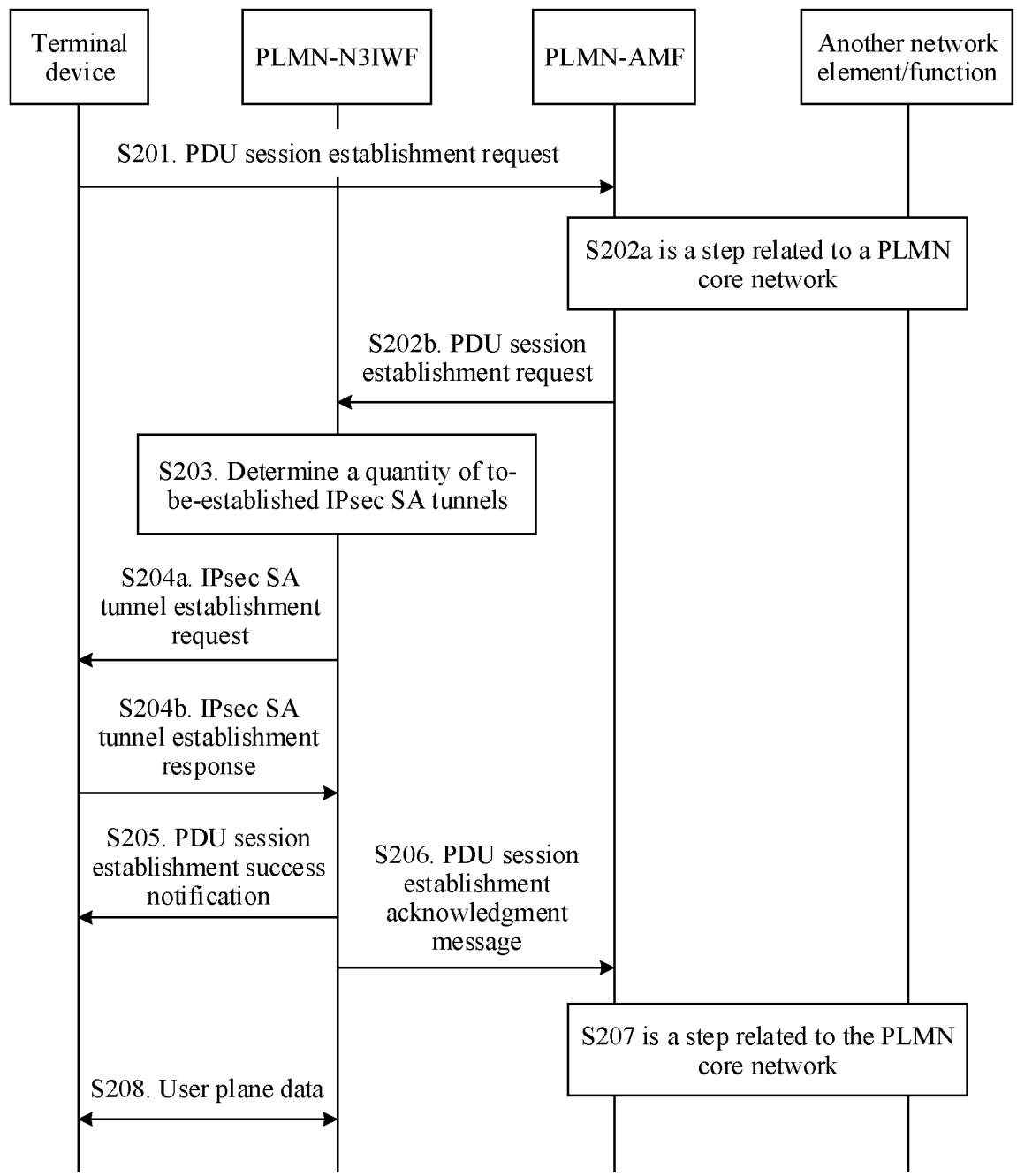
FIG. 5 is a schematic flowchart of providing an NPN service for a terminal device by using a PLMN.

The following describes how to provide an NPN service for a terminal device by using a PLMN network with reference to FIG. 4 and FIG. 5.

FIG. 4 is a schematic diagram of a network architecture for providing an NPN service for a terminal device by using a PLMN network.

FIG. 5 is a schematic flowchart of providing an NPN service for a terminal device by using a PLMN.

S201. The terminal device sends a PDU session establishment request message to an NPN-AMF.

Before the terminal device sends the PDU session establishment request message to the NPN-AMF, the terminal device first establishes, with an NPN-N3IWF, an IPsec SA tunnel used for control signaling transmission.

The terminal device sends NAS signaling to the NPN-AMF by using a PLMN-3GPP access device (such as a base station) and the NPN-N3IWF, to request to set up a PDU session resource of an NPN. The NAS signaling may carry information such as a PDU ID.

S202a is a related setup operation of a control plane and a user plane between related network elements of the NPN-AMF and an NPN core network. For the related setup operation of the control plane and the user plane, refer to an existing procedure. Details are not described herein.

S202b. The NPN-AMF sends the PDU session establishment request message to the NPN-N3IWF.

A PLMN-AMF may send a PDU session establishment request message to a NPN-N3IWF, and the message may further include information such as a PDU session ID, QoS flow related information included in a PDU session, and a QFI.

S203. The NPN-N3IWF determines a to-be-established IPsec SA tunnel.

The NPN-N3IWF determines, based on a QoS flow of the PDU session that needs to be established in operation S202, the IPsec SA tunnel that needs to be established for user plane data transmission. For example, if the NPN-N3IWF determines to establish an IPsec SA tunnel for user plane data transmission for a PDU session, all QoS flows of the PDU session in operation S202 are bound to the IPsec SA tunnel. During the bounding, data is sent through the IPsec SA tunnel.

S204a. The NPN-N3IWF sends an IPsec SA tunnel establishment request to the terminal device.

An IPsec SA tunnel is established between the NPN-N3IWF and the terminal device. The NPN-N3IWF may send an IPsec SA tunnel establishment request message to the terminal device, and the request message may be used to indicate that the IPsec SA tunnel established by the terminal device may be configured to send data corresponding to any one or more of the following information: (a) a PDU session identifier, (b) a QoS flow identifier, (c) a differentiated services code point (DSCP) value, and the like. It should be understood that, if the NPN-N3IWF notifies the terminal device of the DSCP value, each IP packet transmitted between the terminal device and the NPN-N3IWF subsequently needs to carry a corresponding DSCP value. The DSCP is used to ensure QoS of communication, and is encoded in an identifier byte of an IP header of a data packet, to identify a service type and a priority of a service.

S204b. The terminal device sends an IPsec SA tunnel establishment response to the NPN-N3IWF.

S205. The NPN-N3IWF may send a PDU session establishment success notification to the terminal device, to indicate that the PDU session is successfully established.

S206. The NPN-N3IWF sends a PDU session establishment acknowledgment message (N2 PDU session request ACK) to the NPN-AMF, to indicate that the PDU session is successfully established.

S207 is a related setup operation of a control plane and a user plane between related network elements of the NPN-AMF and an NPN core network. For a setup process of the control plane and the user plane, refer to an existing procedure. Details are not described herein.

S208. The NPN-N3IWF performs user plane data transmission with the terminal device.

When the terminal device needs to transmit a UL PDU session to the NPN-N3IWF through the IPsec SA tunnel, a UL PDU packet needs to carry QFI information. When the NPN-N3IWF receives downlink (DL) PDU data from an NPN core network element, a UPF, the NPN-N3IWF determines, by using the PDU ID and the QFI, an IPsec tunnel to be used for transmission to the terminal device, and adds the QFI in a to-be-transmitted DL PDU packet.

Figure 6:
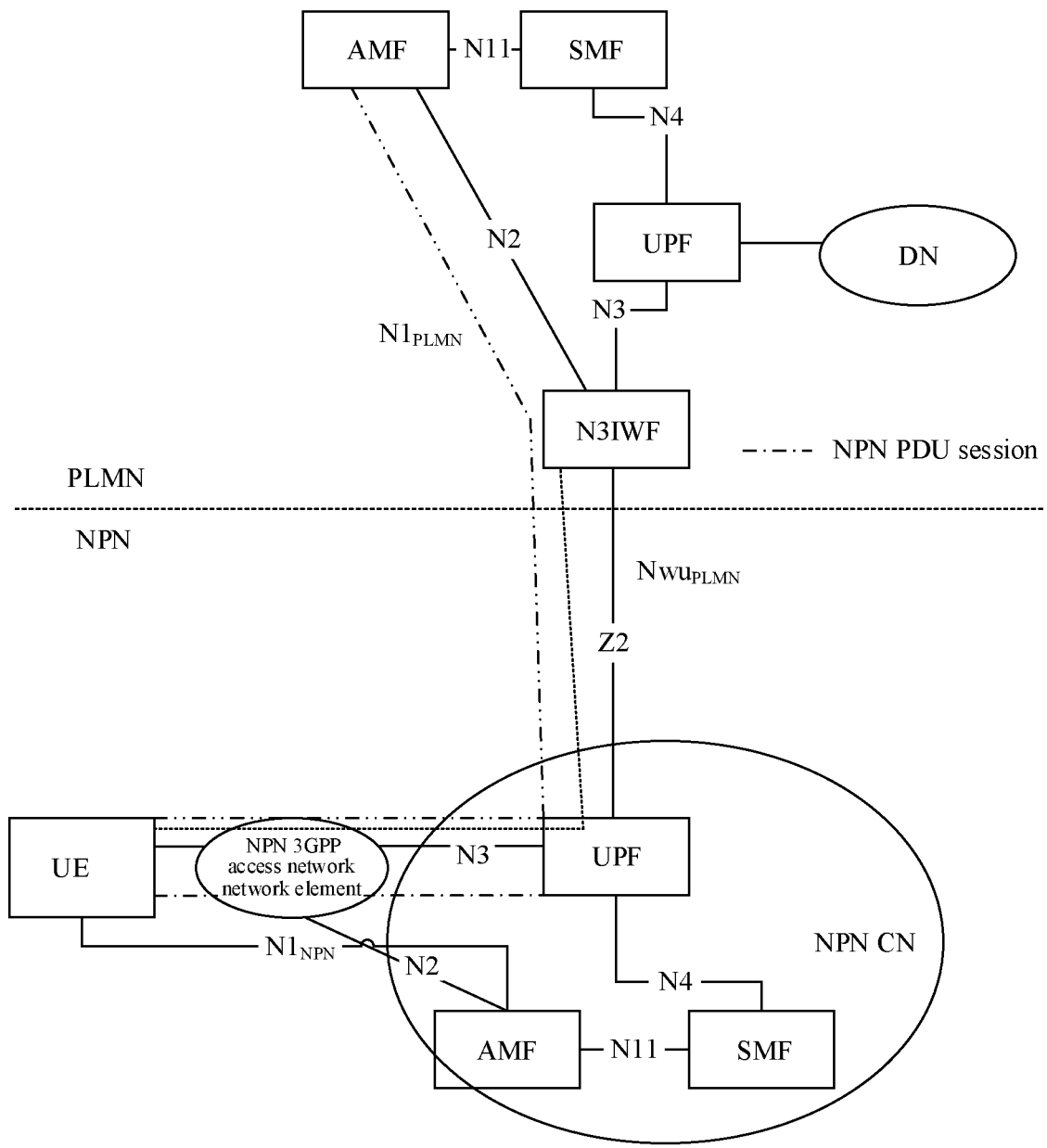
FIG. 6 is a schematic diagram of a network architecture for providing an NPN service for a terminal device by using an NPN.

FIG. 6 is a schematic diagram of a network architecture for providing an NPN service for a terminal device by using an NPN.

That an NPN service is provided for a terminal device by using an NPN means that the terminal device is located in the NPN and an NPN PDU session resource is set up for the terminal device.

A setup process of an NPN PDU session resource is a process of configuring wireless and wired resources for user plane data transmission. PDU session establishment involves a plurality of network elements (such as an AMF, an SMF, and a UPF) between a terminal and a DN, and is an end-to-end configuration process. The process of providing the NPN service for the terminal device by using the NPN may be: When the terminal device is located in a cell of the NPN, a wireless resource (such as a DRB) set up for an NPN PDU session of the terminal device is carried on an access network device of the NPN, and a wired resource (a data transmission tunnel of a core network) is carried on a core network device (such as a UPF) of the NPN. In this case, the process of configuring the NPN PDU session resource for the terminal device is the same as a conventional process of setting up a PDU session resource. Details are not described herein.

It should be understood that the embodiments of this application relate to a process in which a terminal device moves from an original network to a target network, in other words, relate to a cross-network handover of the terminal device. The following describes a cross-network handover process of the terminal device with reference to the accompanying drawings.

Figure 7:
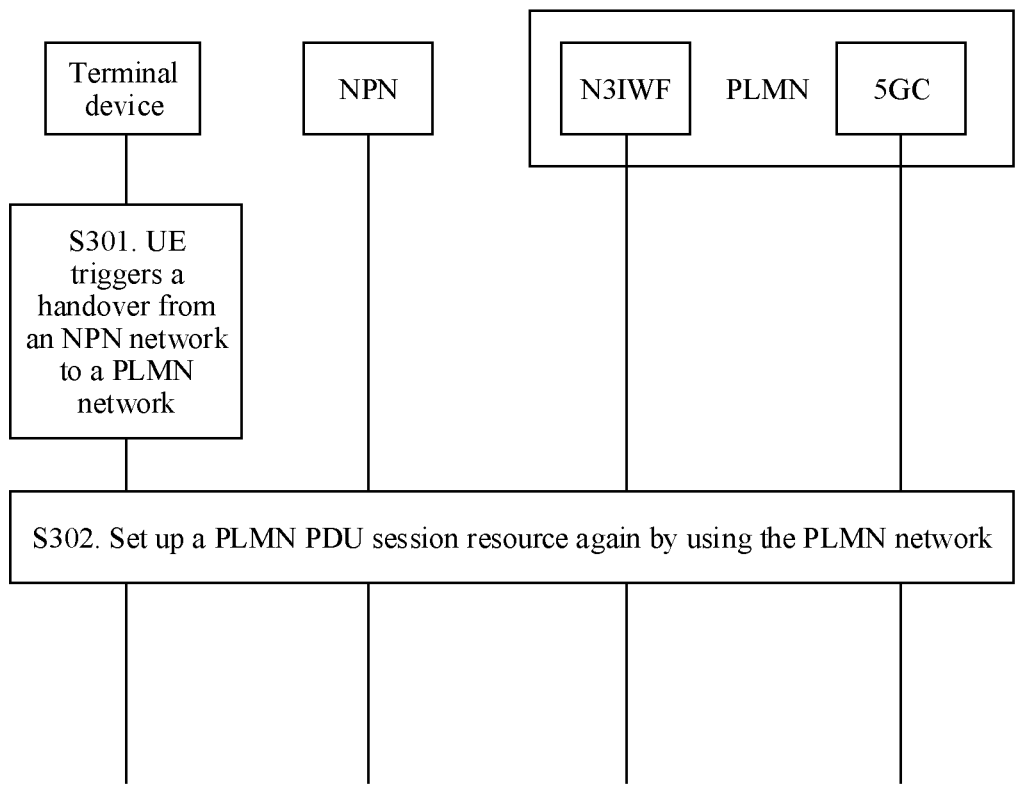
FIG. 7 is a schematic diagram of a cross-network handover of a terminal device.

FIG. 7 is a schematic diagram of a cross-network handover of a terminal device. It should be understood that the diagram is also applicable to a cross-network movement of the terminal device, a cross-network handover of the terminal device, cross-network cell reselection of the terminal device, or cross-network cell selection of the terminal device, and "handover" in the description may be replaced with "movement", "cell reselection", or "cell selection". The following content is included.

S301. The terminal device autonomously triggers a handover from an NPN to a PLMN.

It should be understood that before the terminal device is handed over, a PLMN PDU session resource and/or an NPN PDU session resource are/is first set up in the NPN. For a specific process in which the terminal device sets up the PLMN PDU session resource and/or the NPN PDU session resource in the NPN, refer to the foregoing corresponding descriptions.

S302. Set up a PLMN PDU session resource and/or an NPN PDU session resource again by using the PLMN.

After the terminal device is handed over to a target network, that is, the PLMN, the PLMN PDU session resource and/or the NPN PDU session resource may be set up again by using the PLMN.

The following describes service continuity during a network switch with reference to the accompanying drawings.

Figure 8:
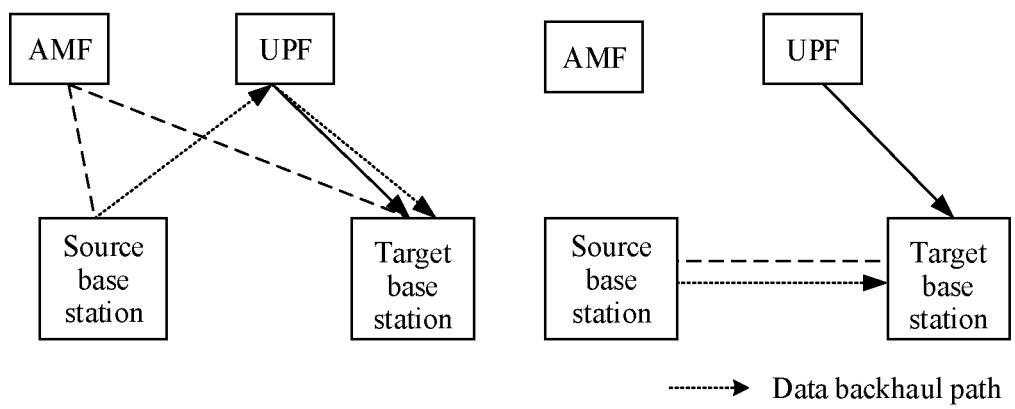
FIG. 8 is a schematic diagram of ensuring service continuity by using a data forwarding technology during a network switch.

FIG. 8 is a schematic diagram of ensuring service continuity by using a data forwarding technology during a network switch. A schematic diagram on the left of FIG. 8 shows a network architecture based on an NG interface, and a schematic diagram on the right of FIG. 8 shows a network architecture based on an Xn interface.

As shown in the figure on the left of FIG. 8, in a network switch scenario, when a terminal device is handed over from an original base station (or a source base station S-RAN) to a target base station (or a T-RAN), the source base station notifies, by using an AMF, the target base station of PDU session resources that need to be set up for the terminal device, to ensure continuity of a PDU session when the terminal device is being handed over. A notification message sent by the source base station to the target base station may carry information such as a PDU ID, a QoS flow ID, a DRB ID, and a QoS flow mapping table. After the target base station configures the corresponding PDU session resources for the terminal device based on the notification message from the source base station, a network side may indicate the terminal device to perform the handover.

It should be understood that, in a handover process, to ensure service continuity, data that has been sent to the source base station but has not been sent by the source base station to the terminal device or a core network may be sent by the source base station to the target base station through a data forwarding path by using a data forwarding method; then, the target base station sends the data to the terminal device or the core network.

The data forwarding path may be at a PDU session granularity or a DRB session granularity. When the data forwarding path is at the DRB session granularity, the source base station may notify, by using the AMF, the target base station of a sending status of data in a corresponding DRB. For example, uplink/downlink RAN status transfer (uplink/downlink RAN status transfer) is used to carry uplink packet data convergence protocol (PDCP) sequence number (SN) and hyper frame number (HFN) receiver status (uplink PDCP-SN and HFN receiver status) information, and downlink PDCP SN and HFN transmitter status (downlink PDCP SN and HFN transmitter status) information. The status information may include: an uplink/downlink count value (UL/DL count value) of an information element, such as a UL/DL PDCP SN or an HFN for the PDCP SN; and a receiving status of an uplink PDCP service data unit (receive status of UL PDCP SDUs). Information about the receiving status of the uplink PDCP service data unit may reflect whether a receiver has successfully received a specific UL PDCP SDU. For example, 0 indicates that a corresponding PDCP is not successfully received, and 1 indicates that a corresponding PDCP is successfully received.

Similarly, a handover process for the network structure based on the Xn interface shown on the right of FIG. 8 may be: When a terminal device is handed over from a source base station to a target base station, the source base station notifies, by using the Xn interface, the target base station of PDU session resources that need to be set up for the terminal device. A notification message sent by the source base station to the target base station may further carry a PDU ID, a QoS flow ID, and a mapping list between a DRB and a QoS flow, to ensure continuity of a PDU session when the terminal device is being handed over. After the target base station configures the corresponding PDU session resources for the terminal device, a network side indicates the terminal device to perform the handover.

It should be understood that, in a handover process, to ensure service continuity, data that has been sent to a source access network device but has not been sent by the source access network device to the terminal device or a core network may be sent by the source access network device to a target access network device through a data forwarding path by using a data forwarding method; then, the target access network device sends the data to the terminal device or the core network. The data forwarding path may be that the source access network device directly sends, to the target access network device through an Xn interface between the source access network device and the target access network device, data that needs to be forwarded. In this case, the source access network device and the target access network device each may assign a port address to the data forwarding path.

It can be learned that when the terminal device is to be handed over within a network, a network side determines whether and when the terminal device is to be handed over. A target network has configured a PDU session resource for the terminal device before the terminal device is handed over, to ensure continuity of a PDU session in the target network. However, during actual application, there may be a scenario in which the terminal device is handed over across networks, for example, handed over from a private network to a public network or handed over from a public network to a private network. In this case, the terminal device itself determines whether to perform a handover and when to perform the handover, or the terminal device itself determines whether to perform cross-network cell reselection or cross-network cell selection and when to perform the cross-network cell reselection or the cross-network cell selection, and a network side does not know whether the terminal device performs the handover, cross-network cell reselection or cross-network cell selection and when to perform the handover, cross-network cell reselection or cross-network cell selection. Therefore, a target network cannot preconfigure a PDU session resource for the terminal device before the terminal device is handed over, and cannot ensure continuity of a PDU session after the terminal device moves.

To resolve the foregoing problem, an embodiment of this application provides a data transmission method. A data forwarding path is designed depending on whether an interface between a source base station and a target base station can send control plane data, so that data that needs to be forwarded in a source network is transferred to a target network based on the interface between the source base station and the target base station, thereby ensuring service continuity.

In addition, it should be understood that the data transmission method provided in this embodiment of this application may be applied to a network architecture including a shared-access network device. An application scenario of the data transmission method provided in this embodiment of this application may be: After moving from a source network to a target network, a terminal device transmits, to a target access network device through a data forwarding path, data that needs to be forwarded by a source access network device. The source access network device may be an access network device in the source network, the target access network device may be an access network device in the target network, and either of the source access network device and the target access network device may be a shared-access network device. The shared-access network device may mean that cells of different networks may be configured for one access network device, and the terminal device may access different networks by using one shared-access network device. In the embodiments of this application, the shared-access network device may be an access network device shared by a cell of a first network and a cell of a second network.

Figure 9:
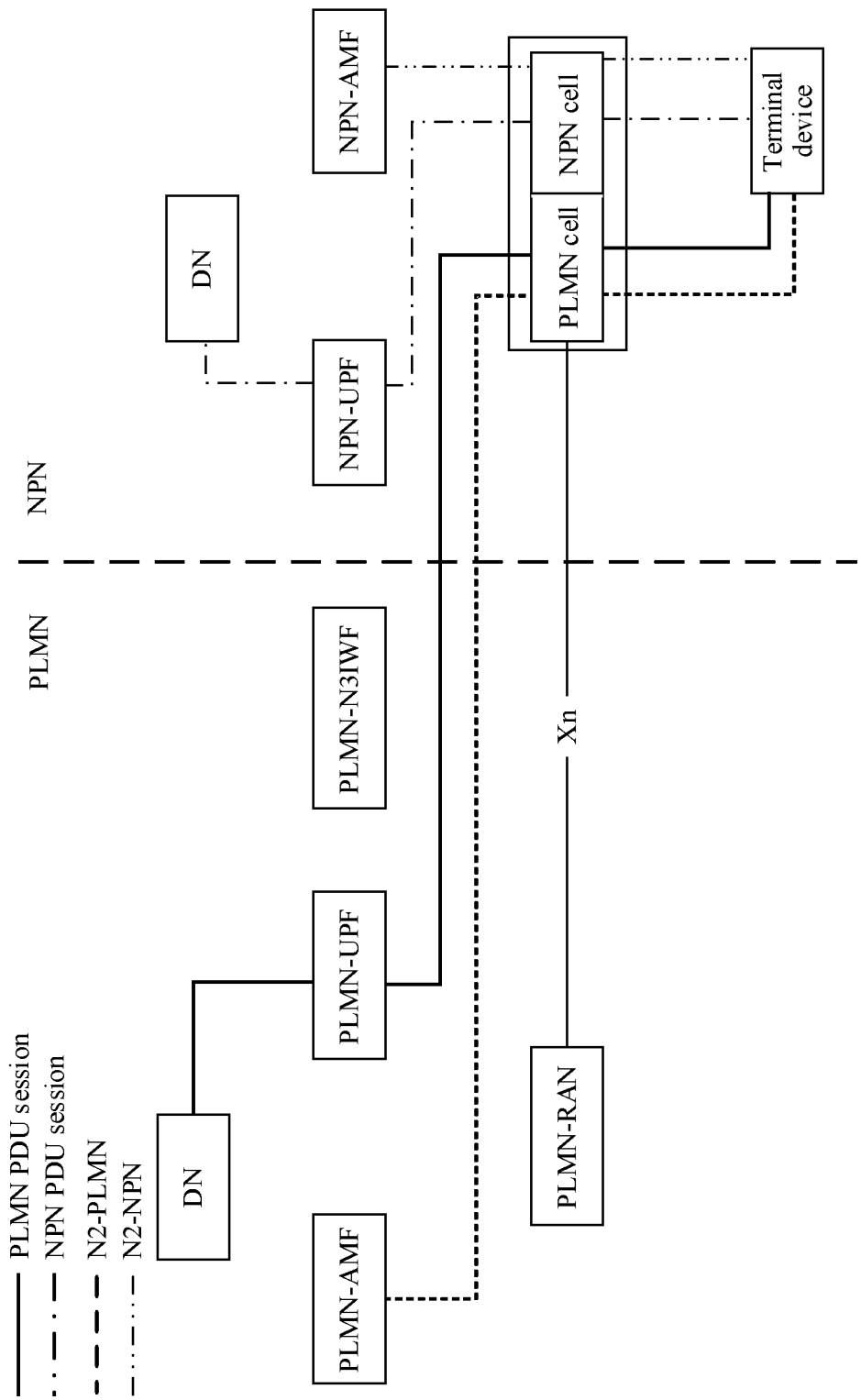
FIG. 9 is a schematic diagram of a shared-access network architecture.

For ease of understanding of a shared-access network architecture, the shared-access network architecture is described by using an example with reference to FIG. 9. As shown in FIG. 9, in a scenario in which an access network device is shared, an access network device in an NPN may be a shared-access network device, and is configured with cells of a PLMN and the NPN. Different from the case in FIG. 1 in which the PLMN PDU session resource is carried on the terminal device, the NPN access network device, the NPN-UPF, the DN, the PLMN-N3IWF, the PLMN-UPF, or the DN, a PLMN session resource of a terminal device may be directly set up by the terminal device, the shared-access network device, a PLMN UPF, and a data network DN. In addition, when an access network device in one of two networks is a shared-access network device, an Xn interface may exist between the shared-access network device and an access network device in the other network. The Xn interface is capable of performing user plane data transmission and control plane data transmission, or is capable only of user plane data transmission.

For different data transmission capabilities supported by interfaces between access network devices in different networks, different data forwarding methods are provided in the following embodiments of this application. A first method is applicable to a scenario in which an interface between a first access network device and a second access network device is capable only of performing user plane data transmission but is not capable of performing control plane data transmission (where the method is also applicable to a scenario in which the interface between the first access network device and the second access network device is capable of performing both user plane data transmission and control plane data transmission): After moving to a second network, a terminal device sends NAS information to a first AMF (for example, notifies the AMF of location information of the terminal device before the terminal device moves and location information of the terminal device after the terminal device moves), so that the AMF further notifies the first access network device of the information (for example, the location information), and the first access network device sends related information to the second access network device based on the information (for example, the location information of the terminal device) by using the first AMF, the terminal device, and the like. A second method is applicable to a scenario in which an interface between a first access network device and a second access network device is capable of performing both user plane data transmission and control plane data transmission: After moving to a second network, a terminal device sends RRC information to the second access network device (for example, the terminal device notifies the second access network device of location information of the terminal device before the terminal device moves and location information of the terminal device after the terminal device moves; or the terminal device may first send the information to a second AMF by using NAS information, and then the second AMF notifies the second access network device of the information). The second access network device sends related information to the first access network device based on the information (for example, the location information of the terminal device). It should be understood that before the terminal device sends the NAS information to the first AMF, sends the RRC information to the second access network device, or sends the NAS message to the second AMF, a specific scenario needs to be determined, that is, whether the interface is capable of performing both user plane data communication and control plane data communication or the interface is capable only of performing user plane data communication and is not capable of performing control plane data communication needs to be determined. A specific determining method may be: The terminal device may first send a radio resource control (RRC) message to the second access network device (or the terminal device may first send NAS information to the second AMF, and then the second AMF notifies the second access network device of the NAS information). If a feedback message of the second access network device indicates that the interface between the second access network device and the first access network device is not capable of performing control plane data transmission, the terminal device sends NAS signaling to the first AMF. Sending an RRC message is used as an example. When the terminal device sends the RRC message to the second access network device, the second access network device may send a notification message to the terminal device to notify the terminal device that the interface between the second access network device and the first access network device is not capable of performing control plane data transmission. For example, indication information (an indicator) is carried to indicate that the interface between the second access network device and the first access network device is not capable of performing control plane data transmission and/or user plane data transmission. The notification message may also carry a cause value indicating why control plane data transmission cannot be performed, and the cause value may be that no interface is configured, a configured interface has only some functions, or the like. In addition, the second access network device may first notify, by broadcasting (for example, by broadcasting system information) MAC CE signaling or another RRC message, the terminal device of whether an interface between the second access network device and the first access network device, another access network device, or an access network device that has an interface connected to the second access network device is capable of performing control plane data transmission and/or user plane data transmission. For example, the second access network device broadcasts capability information by using the system information, to notify the terminal device of the foregoing information and scenario. It should be understood that a standard may also specify a method that is first used by the terminal device by default to send a message. For example, the standard may specify that after moving, the terminal device first uses the first method by default to send a message.

When the UE has obtained a MIB, a SIB1, or another system information message in a cell, if the UE needs to store the obtained SIB, the UE needs to store an area scope that is associated with the system information and that is indicated in si-SchedulingInfo of the SIB1, a system information area identifier, a value tag, a first PLMN ID in a PLMN identity information list of the SIB1, and a cell identity. The stored information is used to verify whether the stored system information is valid. The UE may use a valid storage version of system information other than the MIB, the SIB1, a SIB6, a SIB7, or a SIB8, for example, return from outside the coverage after cell reselection or after receiving a system information change indication.

To enable the UE to reuse the stored system information, a SIB (other than the SIB1, the SIB6, the SIB7, or the SIB8) in NR is associated with association information. The association information includes one or more of the following: an area scope, a system information area identifier, a value tag, a first PLMN ID in a PLMN identity information list of the SIB1, and a cell identity. If the stored SIB is obtained within 3 hours, and the stored corresponding association information matches association information (a value tag), provided for the SIB, in a SIB1 of a new cell, the stored SIB is considered to be valid. The SIB may also be associated with a zone marker (for example, an area scope), and one SIB is allowed to be reused in a plurality of cells.

As described above, when determining whether the locally stored system information is still valid, the terminal device compares whether the locally stored system information is consistent with system information broadcast by a cell, and uses a network identified by the first PLMN ID broadcast by the cell as a primary PLMN during the comparison. For an access network device shared by RANs, in system information (for example, SIB1 system information) broadcast by cells of the access network device, network identification information (for example, a PLMN ID, a network identifier (NID), a closed access group (CAG), and a cell identity) of an NPN and network identification information (for example, a PLMN ID and a cell identity) of a PLMN may be included in a same list entry (for example, in a PLMN identity information list (PLMN-IdentityInfoList)), or network identification information of an NPN and network identification information of a PLMN are included in two different list entries. When the network identification information of the NPN and the network identification information of the PLMN are included in two different list entries, if a network identified by the first PLMN ID in the second list entry is a primary PLMN, the terminal device incorrectly parses that a network identified by the first PLMN ID in a first list entry is the primary PLMN. Consequently, an error occurs when the validity of the stored system information is determined. Therefore, the following solution is provided:

Solution 1: Indication information is added to the first PLMN ID in each of the two list entries, to identify whether a network identified by a corresponding PLMN ID is a primary PLMN.

Solution 2: Indication information is added only to the first PLMN ID in the first list entry or to the first PLMN ID in the second list entry, to indicate whether a network identified by a corresponding PLMN ID is a primary PLMN. For example, if that a network identified by a corresponding PLMN ID is not a primary PLMN is indicated only in the indication information in the first PLMN ID in the second list entry and is not indicated in the indication information in the first PLMN ID in the first list entry, it means that the network identified by the first PLMN ID in the first list entry is the primary PLMN; if that a network identified by a corresponding PLMN ID is a primary PLMN is indicated only in the indication information in the first PLMN ID in the second list entry and is not indicated in the indication information in the first PLMN ID in the first list entry, it means that the network identified by the first PLMN ID in the second list entry is the primary PLMN; if that a network identified by a corresponding PLMN ID is not a primary PLMN is indicated only in the indication information in the first PLMN ID in the first list entry and is not indicated in the indication information in the first PLMN ID in the second list entry, it means that the network identified by the first PLMN ID in the second list entry is the primary PLMN; or if that a network identified by a corresponding PLMN ID is a primary PLMN is indicated only in the indication information in the first PLMN ID in the first list entry and is not indicated in the indication information in the first PLMN ID in the second list entry, it means that the network identified by the first PLMN ID in the first list entry is the primary PLMN.

Solution 3: Indication information is added to a configured primary PLMN ID (for example, a non-first PLMN ID in the first list entry or a non-first PLMN ID in the second list entry), to indicate that a network identified by the PLMN ID is a primary PLMN.

Solution 4: Indication information is added to a location (for example, a location in a PLMN-IDInforList or a PLMN-ID List information element of a SIB1 other than the locations in the solution 1, the solution 2, and the solution 3) that is other than the location in the solution 1, the solution 2, and the solution 3 and that is in system information (for example, the SIB1), to indicate whether the network identified by the first PLMN ID in the first list entry or the network identified by the first PLMN ID in the second list entry is the primary PLMN.

The indication information may also be used to indicate whether the corresponding PLMN ID should be used as a type of association information to verify validity of a SIB, or may be used to indicate whether network identification information such as an NID and/or a CAG ID corresponding to the corresponding PLMN ID should be used as a type of association information to verify validity of a SIB.

If the network identification information of the NPN and the network identification information of the PLMN are included in a same list entry, the network identification information of the NPN and the identification information of the PLMN are listed in different sequences. For example, in SIB1 information of a cell, network identification information of all PLMNs supported by the cell is listed first, and then network identification information of all NPNs supported by the cell is listed; or network identification information of all NPNs supported by the cell is listed first, and then network identification information of all PLMNs supported by the cell is listed. Similarly, if a network identified by a PLMN ID corresponding to the first NPN is a primary PLMN, the terminal device incorrectly parses that a network identified by a PLMN ID corresponding to the first PLMN is the primary PLMN, resulting in a determining error. Therefore, the following solution is provided: An indication information is provided in a PLMN ID corresponding to the primary PLMN to indicate that a network identified by the PLMN ID is the primary PLMN.

Alternatively, behavior specifications of terminal devices in different versions are redefined. For example, when it is defined in the R16 standard that a cellReservedForOtherUse information element in a SIB1 is set to true, and a network identification information list (PLMN-IDInforList) used to indicate a SIB1 of a cell is used for an NPN (for example, an SNPN), a terminal device in R15 should consider that the cell is barred, and the terminal device no longer compares a PLMN ID corresponding to a stored SIB with a PLMN ID broadcast by the cell, and considers the stored SIB as invalid in the cell.

For another example, if a SIB1 of a cell that supports only an SNPN includes only one network identification information list, the first PLMN ID in the SIB1 may be a special PLMN identity (for example, MCC=999) used for the SNPN or a PLMN ID the same as that of a public network, which is a case 1; or if a SIB1 of a cell that supports only an SNPN includes two or more network identification information lists, the first PLMN ID in a first network identification information list is set to a dummy value (dummy), which is a case 2. The first PLMN ID in the SIB1 is not unique in both cases. Therefore, there is a risk that the terminal device mistakenly considers that the stored SIB is valid. To resolve this problem, the terminal device needs to use first network identification information (for example, a PLMN ID and an NID and/or a CAG ID) instead of the first PLMN identity when verifying a SIB. For another example, in the case 1, it is stipulated that a terminal device in Release 16 or a later release uses the first network identification information (for example, a PLMN ID and an NID and/or a CAG ID) instead of the first PLMN identity to verify validity of a SIB. For another example, in the case 2, it is stipulated that a terminal device in Release 15 or an earlier version invalidates a stored SIB in a current cell, and a terminal device in Release 16 or a later version compares identification information such as the first PLMN ID and/or an NID and/or a CAG ID in the second network identification information list.

For another example, the terminal stores a PLMN ID (where the PLMN ID is a network identifier of a public network or a network identifier of an NPN). The first PLMN ID in a SIB1 of a verified cell is a network identifier of the NPN (that is, a NID and/or a CAG ID is also provided together with the first PLMN ID in the SIB1). The PLMN ID stored in the terminal device is the same as the first PLMN ID in the SIB1 of the to-be-verified cell. If the PLMN ID stored in the terminal device is a network identifier of a public network, and after receiving SIB1 information of a to-be-verified cell, the terminal device compares only the PLMN IDs, but does not compare NIDs and/or CAG IDs corresponding to the PLMN IDs, the terminal device incorrectly considers that a stored SIB is valid in the to-be-verified cell. Alternatively, if the PLMN ID stored in the terminal device is a network identifier of an NPN, but the terminal device does not store a NID and/or a CAG ID corresponding to the PLMN ID, after receiving SIB1 information of a to-be-verified cell, the terminal device compares the PLMN ID with the NID and/or the CAG ID corresponding to the PLMN ID, and the terminal device incorrectly considers that the stored SIB is invalid in the to-be-verified cell. Therefore, the following regulations need to be set for the terminal device:

regulation 1: if information such as the NID and/or the CAG ID corresponding to the PLMN ID is stored, the information such as the NID and/or the CAG ID corresponding to the PLMN ID also needs to be verified when the validity of the SIB is verified;

regulation 2: only the PLMN ID is verified (for example, only the PLMN ID is stored), but the indication information in the foregoing solution is required for facilitating the verification;

regulation 3: the terminal device compares more than one stored PLMN ID with more than one PLMN ID in the SIB1 (for example, the first two or more or all PLMN IDs in the stored SIB1) of the to-be-verified cell;

regulation 4: the terminal device compares identification information of the first network instead of the first PLMN ID; or regulation 5: if the PLMN ID in the first network identification information list in the SIB1 of the to-be-verified cell is dummy, the terminal device compares the first PLMN ID or network identification information in the second network identification information list.

It should be understood that providing the indication information in the PLMN ID may be that the PLMN ID itself has an indication function, or may be that another indication information element is provided while the PLMN ID is provided for the SIB1.

First, a scenario in which interfaces between different access network devices can support both user plane data transmission and control plane data transmission is described. For ease of understanding, the data transmission method provided in the embodiments of this application is described by using an NPN and a PLMN as examples.

Figure 10:
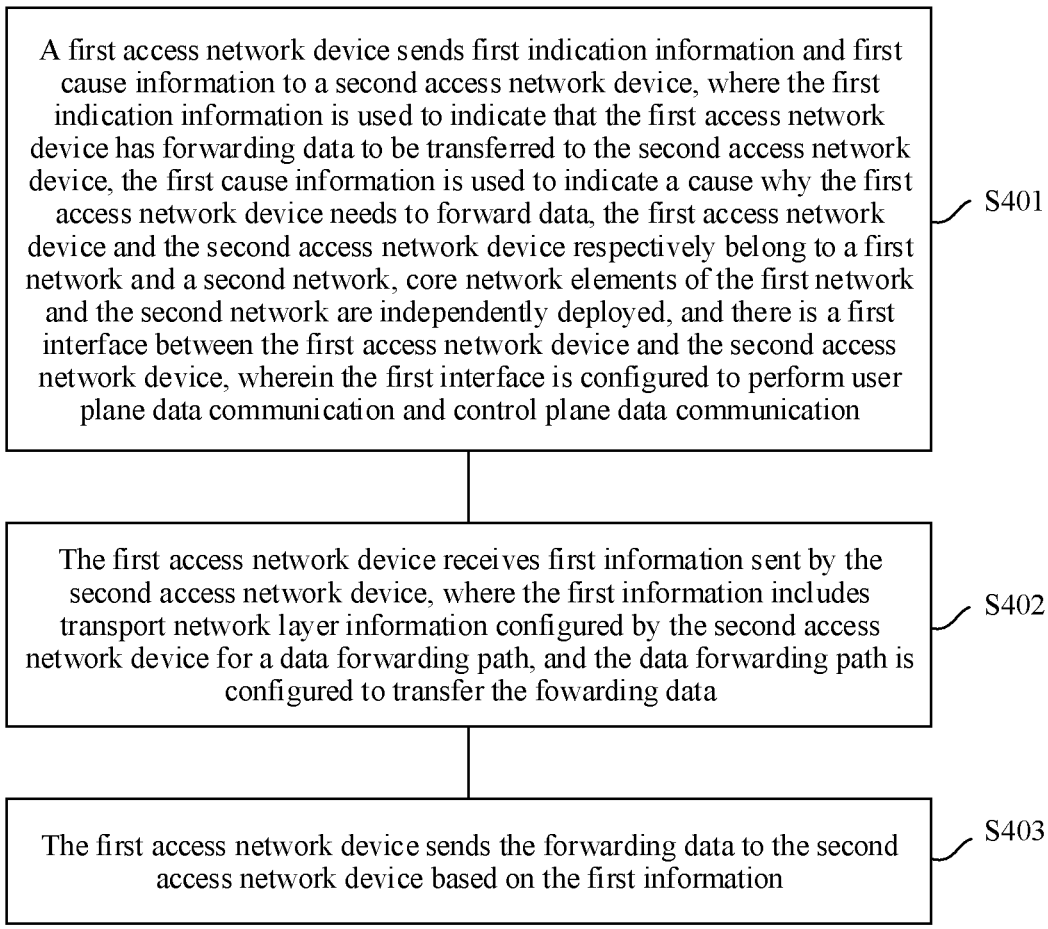
FIG. 10 is a schematic flowchart of a data transmission method according to an embodiment of this application.

FIG. 10 is a schematic flowchart of a data transmission method according to an embodiment of this application. The method includes the following operations:

S401. A first access network device sends first indication information and first cause information to a second access network device, where the first indication information is used to indicate that the first access network device has forwarding data to be transferred to the second access network device, the first cause information is used to indicate a cause why the first access network device needs to forward data, the first access network device and the second access network device respectively belong to a first network and a second network, core network elements of the first network and the second network are independently deployed, there is a first interface between the first access network device and the second access network device, and the first interface is configured to perform user plane data communication and control plane data communication.

S402. The first access network device receives first information sent by the second access network device, where the first information includes transport network layer information configured by the second access network device for a data forwarding path, and the data forwarding path is configured to transferred the forwarding data.

S403. The first access network device sends the forwarding data to the second access network device based on the first information.

The following describes in detail the data transmission method provided in the embodiments of this application with reference to the accompanying drawings.

Figure 11:
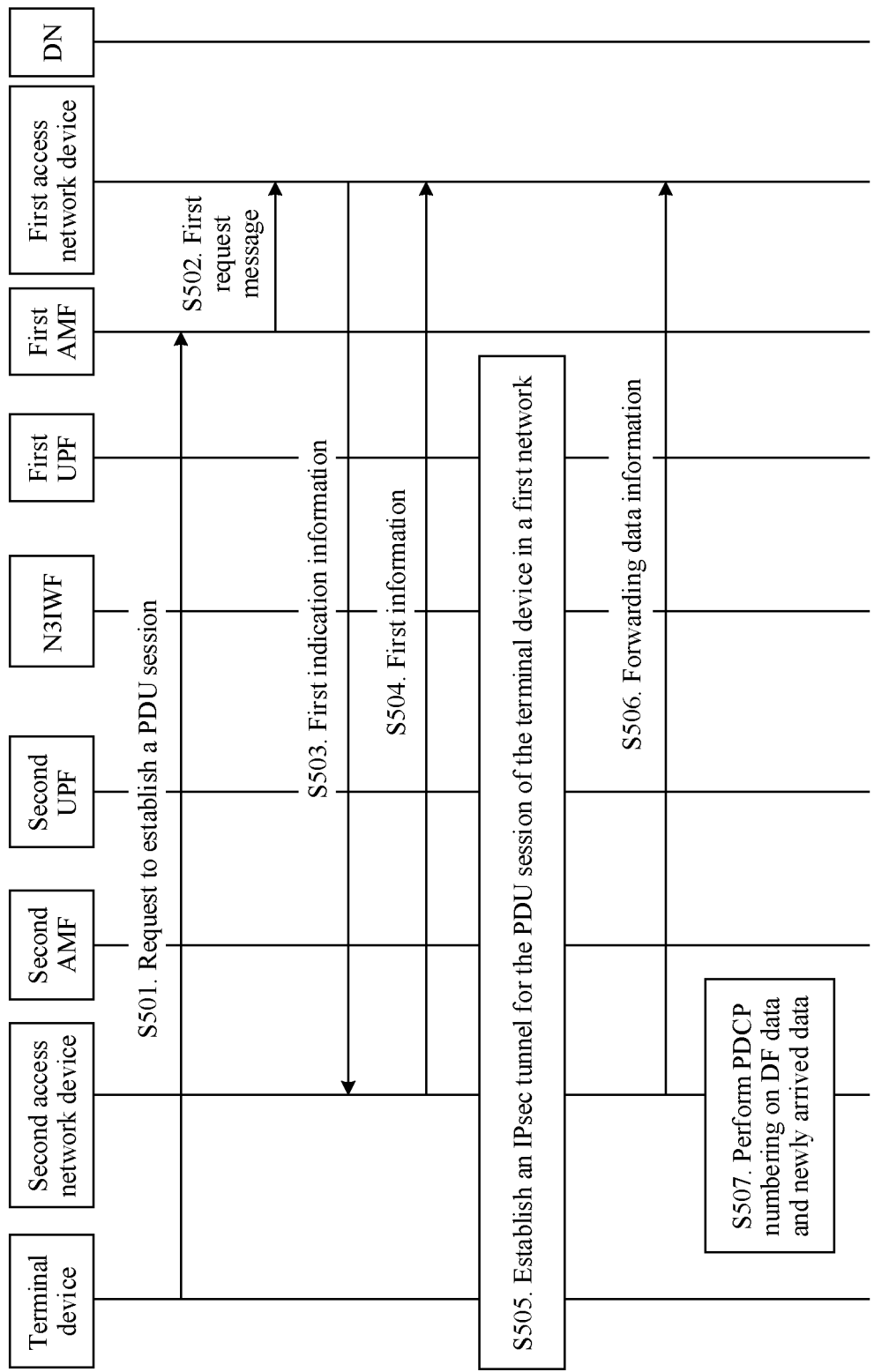
FIG. 11 is a schematic flowchart of a data transmission method according to an embodiment of this application.

FIG. 11 is a schematic flowchart of a data transmission method according to an embodiment of this application.

A specific application scenario of the data transmission method provided in this embodiment may be, for example, as follows: A terminal device sets up an NPN PDU session resource in a cell of an NPN that has an NPN shared-access network device (shared-RAN). Then, the terminal device moves to a PLMN and accesses a PLMN access network device. In this case, there is an Xn interface between the shared-access network device and the PLMN access network device, and the Xn interface may be used for user plane transmission, and may also be used for control plane signaling transmission. In this scenario, a process in which an access network device of a network in which the terminal device is located before the terminal device moves transmits to-be-forwarded data to an access network device of a network in which the terminal device is located after the terminal device moves includes the following content.

S501. The terminal device requests a first AMF to establish a PDU session.

The first AMF is an AMF in a first network, and the first network is a network corresponding to a cell in which the terminal device is located before the terminal device moves. For example, the first network may be an NPN.

It should be understood that the terminal device may be located in the first network before the terminal device moves, and access a cell of the first network to set up a PDU session resource of the first network. When the terminal device autonomously determines to move to a cell of a second network, the terminal device needs to re-establish a PDU session with the first network to perform a subsequent data forwarding process. The terminal device first establishes an IPsec path to an N3IWF to transmit NAS signaling, and then requests an AMF (denoted as a first AMF) in the first network to establish a PDU session. It should be understood that "moving" in this application may be replaced with "handover", "cell reselection", "cell selection", or the like.

In an implementation, after the IPsec path is established between the terminal device and the N3IWF, the terminal device may send NAS signaling (for example, a PDU session establishment request message/an initial UE message) to the first AMF, to request to establish the PDU session in the first network. When requesting the first AMF to establish the PDU session in the first network, the terminal device may further add, to a PDU session establishment request message sent by the first AMF, a cause for establishing the PDU session, a type of the PDU session, information about a new re-accessed cell, information about the cell of the first network in which the terminal device is located before the terminal device reselects the second network, and the like. For example, the cause for establishing the PDU session may be: a cross-network handover of the terminal device, cross-network cell reselection, or cross-network cell selection (for example, reselection from a cell of an SNPN to a cell of a PLMN or a PNI-NPN, that is, SNPNtoPLMN or SNPNtoPNI-NPN). The type of the PDU session may be an NPN PDU session. The information about the new re-accessed cell may be: a network identifier of a network in which the terminal device is located after the terminal device moves, a cell identifier, an access network device identifier, and a tracing area code (TAC), for example, PLMN ID+cell ID+RAN Node ID+TAC. Location information of the terminal device in the first network before the terminal device moves may be: a first network identifier, a cell identifier, a tracing area code, an access network device identifier, and a closed access group identifier (CAG ID), for example, PLMN ID+NID+cell ID+TAC+RAN code ID or PLMN ID+CAG ID+cell ID+TAC+RAN code ID. An identifier of the terminal device may be, for example, an international mobile subscriber identification number (IMSI), for example, a 5G-S-IMSI.

It should be understood that the foregoing listed specific information carried in the PDU session establishment request message sent by the terminal device to the first AMF is merely an example. The PDU session establishment request message may further include a plurality of other types of information. This is not limited in this embodiment of this application.

S502. The first AMF sends a first request message to a first access network device.

The first AMF obtains location information of the first access network device based on the location information of the first network carried in the PDU session establishment request message sent by the terminal device, and sends the first request message to the first access network device based on the location information.

In an implementation, the first request message is used to query about the first access network device whether data of a corresponding terminal device needs to be forwarded (that is, forwarding data) on the first access network device.

It should be understood that the forwarding data in this embodiment of this application may be data that is sent by the first access network device but not successfully received by the terminal device, out-of-order data that is sent by the terminal device to a core network and that is received by the first access network device, to-be-resorted data that is sent by the terminal device and that is received by the first access network device and that is further sent to a core network, or the like.

In an implementation, the first request message may be, for example, a data forwarding request or a handover request.

In an implementation, the first request message may include location information that is of the terminal device after the terminal device moves and that is sent by the terminal device to the first AMF in operation S501. In addition, the first request message may further include information such as a cause for sending the first request message, location information of the terminal device before the terminal device moves, an identifier of the PDU session requested to be established by the terminal device, a PDU session type, a QoS flow identifier, and an identifier of the terminal device.

S503. The first access network device sends first indication information and first cause information to a second access network device.

The second access network device is an access network device in the second network. The second network is a network corresponding to a cell in which the terminal device is located after the terminal device moves, and the second network and the first network may be networks of different types, For example, when the first network is a non-public network SNPN, the second network may be a public land mobile network PLMN; when the first network is a PLMN, the second network may be an SNPN; when the first network is a PNI-NPN, the second network is an SNPN; or when the first network is an SNPN, the second network is a PNI-NPN.

It should be understood that core networks of the first network and the second network are independently deployed, and one of the first access network device in the first network and the second access network device in the second network is a shared-access network device, in other words, there is a first interface between the first access network device and the second access network device. The first interface may be configured to perform user plane data communication and control plane data communication, and the first interface may be, for example, an Xn interface.

In an implementation, the first access network device may send the first indication information and the first cause information to the second access network device based on the location information that is of the newly accessed cell of the terminal device and that is received in operation S502. The first indication information is used to indicate that the first access network device has forwarding data to be transferred to the second access network device. The first cause information is used to indicate a cause why the first access network device needs to forward data.

It should be understood that, because the first interface between the first access network device and the second access network device may be used for user plane data communication and control plane data communication, the first access network device may directly send the first indication information and the first cause information to the second access network device through the first interface.

In an implementation, the first indication information may be used to indicate whether the first access network device needs to forward data (where the indication information may be, for example, a character string Need, not Need, possible, or not possible). When the first access network device indicates that data forwarding does not need to be performed, a cause for not performing data forwarding may also be described. For example, the cause may be: done, which means that the to-be-forwarded data has been transferred; and release, which means that the to-be-forward data has been released and therefore cannot be forwarded.

In an implementation, the first indication information may further include at least one of the following information: a protocol data unit PDU session identifier, a quality of service QoS flow identifier, a data radio bearer DRB identifier, a mapping list between a DRB and a QoS flow, transfer status information of data in a DRB, or a data forwarding cause.

In an implementation, the first indication information may further carry indication information (for example, 0, 1, direct forwarding path is available, or direct forwarding path is not available), to indicate whether data to be forwarded by the first access network device can be directly forwarded to the second access network device through the first interface.

S504. The second access network device sends first information to the first access network device.

The first information includes transport network layer information configured by the second access network device for a data forwarding path, and the data forwarding path is configured to transfer the forwarding data.

It should be understood that, after receiving the first indication information sent by the first access network device, the second access network device determines, based on the first indication information, that the first access network device has forwarding data to be transferred to the second access network device. The second access network device configures the transport network layer information of the data forwarding path configured to transfer the forwarding data.

In an implementation, transport network layer information that is of an uplink or downlink data forwarding path and that is configured by the second access network device may include, for example, a transport layer address (for example, an IP address) and a general packet radio service tunneling protocol (GTP) tunnel endpoint identifier (GTP-TEID).

S505. Establish an IPsec tunnel for the PDU session of the terminal device in the first network.

It should be understood that, because the terminal device requests the first AMF to establish the PDU session in S501, each network element needs to configure a corresponding resource for the PDU session of the terminal device in the first network to enable the terminal device to access data of the first network by using the second network. The resource may be, for example, an IPsec tunnel.

In an implementation, the first AMF may send the PDU session establishment request message to the N3IWF. The PDU session establishment request message may be, for example, a PDU resource setup message or an initial UE context setup message. The PDU session establishment request message may carry information such as an identifier of a PDU session that is requested to be established, a DRB ID, a QFI, a cause for establishing the PDU session, a type of the PDU session, and an identifier of the terminal device. For example, a cause for establishing the PDU session may include, for example, a cross-network handover of the terminal device, cross-network cell reselection of the terminal device, and cross-network cell selection of the terminal device (for example, reselection from a cell of an SNPN to a cell of a PLMN or a PNI-NPN, that is SNPNtoPLMN or SNPNtoPNI-NPN). The type of the PDU session may be, for example, an NPN, a PLMN, an SNPN, a PNI-NPN, or an NPNto5GS. The identifier of the terminal device may be, for example, an IP address of the terminal device.

In an implementation, the N3IWF determines, based on the PDU session establishment request message sent by the first AMF, to establish the corresponding IPsec tunnel for the PDU session.

In an implementation, the terminal device, the second access network device, the second AMF, the second UPF, and the N3IWF may configure, for the terminal device, a corresponding resource of the PDU session, the QoS flow, or the DRB of the terminal device in the first network. For a specific configuration process, refer to an existing process. Details are not described herein.

S506. The first access network device sends the forwarding data to the second access network device based on the first information.

In an implementation, the first access network device may send, to the second access network device through the first interface based on the transport network layer information (for example, UL/DL forwarding UP TNL information) sent by the second access network device, user plane data that needs to be forwarded.

In an implementation, the second access network device may send, to a core network, uplink data in newly arrived data and the forwarding data in the PDU session established by the terminal device in the first network, and send, to the terminal device, downlink data in the newly arrived data and the forwarding data in the PDU session.

In an implementation, if the data forwarding path is of a DRB granularity, the first access network device may further send a data sent state in the DRB to the second access network device. For example, the first access network device may send an uplink access network status transfer (uplink RAN status transfer) message to the second access network device to indicate a sending status of data, and the uplink RAN status transfer message may carry uplink packet data convergence protocol sequence number (packet data convergence protocol sequence number, PDCP-SN) and hyper frame number (HFN) receiver status (that is, uplink PDCP-SN and HFN receiver status) information and downlink PDCP-SN and HFN transmitter status (that is, downlink PDCP-SN and HFN transmitter status) information.

For example, the data sent state may be described by using information such as a UL/DL count value (including a UL/DL PDCP SN, an HFN for PDCP SN, and the like), a transmit status of UL PDCP SDUs (reflecting whether a UL PDCP has been successfully sent, where for example, 0 indicates that a corresponding PDCP has not been successfully sent, and 1 indicates that a corresponding PDCP has been successfully sent), or a receiver status of DL PDCP SDUs (indicating whether a DL PDCP has been successfully received, where for example, 0 indicates that a corresponding PDCP has not been successfully received, and 1 indicates that a corresponding PDCP has been successfully received).

S507. The second access network device performs PDCP numbering on the forwarding data and the newly arrived data.

In an implementation, when the data forwarding path is of a DRB granularity, the second access network device may perform, based on the data sent status information received by the first access network device, PDCP numbering and sorting on the newly arrived data and the forwarding data in the PDU session established by the terminal device in the first network; and then send the uplink data to the core network and send the downlink data to the terminal device.

It should be understood that, to enable in-order data transmission and avoid repeated data sending, the second access network device should not send any uplink data whose PDCP SN value is less than the provided UL PDCP SN value, and should use the provided DL PDCP SN value as the PDCP SN value of the to-be-sent first downlink packet for which no PDCP-SN has been assigned. In other words, after performing PDCP numbering and sorting on the newly arrived and the forwarding data, the second access network device should first send the received forwarding data to the core network or the terminal device in a sequence of numbers, and then transfer related data that is of the terminal device in the second network or the first network and that is subsequently received by the second access network device. In this way, the forwarding data of the terminal device can be transferred in a correct sequence, and repeated sending of the data is avoided.

In an example, for downlink user plane data, the second access network device may perform PDCP numbering and sorting on the received newly arrived data and the forwarding data by using a DRB, and then send the data to the terminal device. The terminal device sends the received data to a higher layer based on the PDCP SN numbers, and the higher layer parses out the user plane data.

In another example, for uplink user plane data, the second access network device may send the uplink user plane data to the first UPF or the second UPF by using an NG interface resource. If the forwarding data belongs to the first network, the second access network device may send the forwarding data to a first UPF, where the first UPF is a core network device of the first network. If the forwarding data belongs to the second network, the second access network device may send the forwarding data to the second UPF, where the second UPF is a core network device of the second network.

According to the data transmission method provided in this embodiment of this application, after the terminal device moves from a cell of the first access network device in the first network to a cell of the second access network device in the second network, the first access network device may send, to the second access network device through the first interface between the first access network device and the second access network device, indication information indicating that data forwarding needs to be performed. The second access network device configures, based on the indication information, corresponding transport network layer information for the data forwarding path required in a data forwarding process, and sends the transport network layer information to the first access network device, to set up a user plane data forwarding bearer resource between the first access network device and the second access network device, ensure service continuity of the terminal device in the first network, and implement a cross-network movement with a relatively small quantity of packet losses or even no packet loss.

Figure 12:
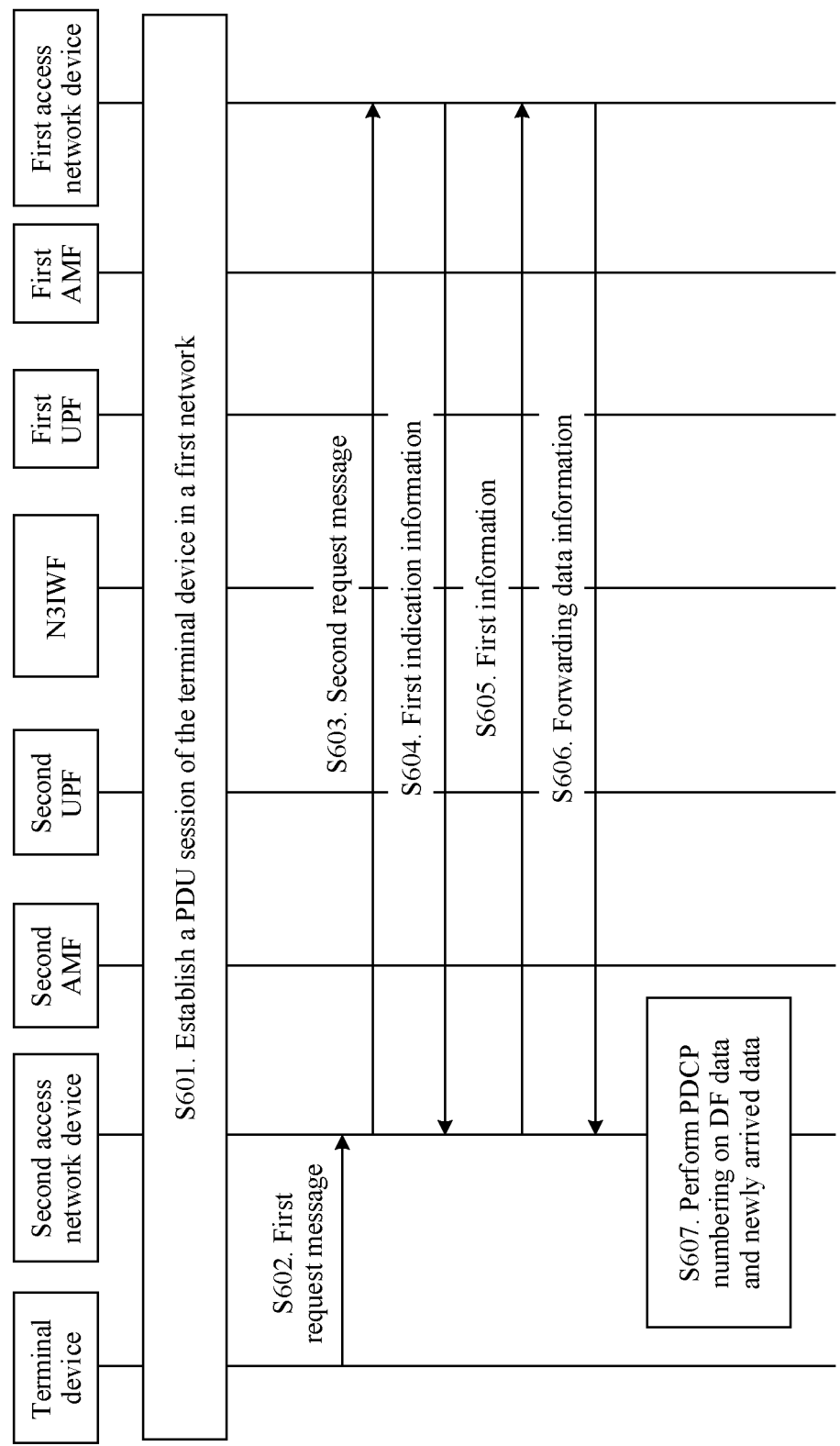
FIG. 12 is a schematic flowchart of another data transmission method according to an embodiment of this application.

FIG. 12 is a schematic flowchart of another data transmission method according to an embodiment of this application.

A specific application scenario of the data transmission method provided in this embodiment may be, for example: A terminal device sets up a PDU session resource in a network cell of a first access network device (a shared-RAN), and then moves to a second network and accesses a second access network device. The first access network device may be a shared-access network device, and there is a first interface between the first access network device and the second access network device. The first interface may be used for user plane transmission or control plane signaling transmission. In this scenario, a method for implementing forwarding data transmission between the first access network device and the second access network device may be: The terminal device may notify the second access network device of location information of the first access network device accessed by the terminal device before the terminal device moves. The second access network device requests a context of the terminal device from the first access network device based on the location information. The first access network device sends the context of the terminal device to the second access network device. A second terminal device sends location information of a data forwarding path to the first access network device based on information in the context, to set up a data forwarding bearer resource between the first access network device and the second access network device.

It should be understood that a first network in this embodiment of this application may be an NPN, and the second network may be a PLMN; the first network is a PLMN, and the second network is an NPN; the first network is a PNI-NPN, and the second network is an SNPN; or the first network is an SNPN, and the second network is a PNI-NPN; and the first interface may be an Xn interface. The data transmission method may include the following operations.

S601. Establish a PDU session of the terminal device in the first network.

It should be understood that the terminal device may be located in the first network before the terminal device moves, and access a cell of the first network to set up a PDU session resource of the first network. When the terminal device autonomously determines to move to a cell of the second network, the terminal device needs to re-establish a PDU session with the first network to perform a subsequent data forwarding process. The terminal device first establishes an IPsec path to an N3IWF to transmit NAS signaling, and then requests a first AMF to establish the PDU session.

In an implementation, after the IPsec path is established between the terminal device and the N3IWF, the terminal device may send NAS signaling (for example, a PDU session establishment request message/an initial UE message) to the first AMF, to request to establish the PDU session in the first network. When requesting the first AMF to establish the PDU session in the first network, the terminal device may further add, to a PDU session establishment request message sent by the first AMF, a cause for establishing the PDU session, a type of the PDU session, location information of a newly accessed cell, location information of a cell of the first network in which the terminal device is located before the terminal device moves to the second network, and the like. For example, the cause for establishing the PDU session may be: a cross-network handover of the terminal device, cross-network cell reselection of the terminal device, or cross-network cell selection (for example, reselection from a cell of an SNPN to a cell of a PLMN or a PNI-NPN, that is, SNPNtoPLMN or SNPN-toPNI-NPN) of the terminal device. The type of the PDU session may be an NPN PDU session or an NPNto5GS PDU session. The information about the new re-accessed cell may be: a network identifier after the cell reselection, a cell identifier, an access network device identifier, and a TAC, such as PLMN ID+cell ID+RAN Node ID+TAC. Location information of the terminal device in the first network before the terminal device moves may be: a first network identifier, a cell identifier, a tracing area code, or an access network device identifier, for example, PLMN+NID+cell ID+TAC+RAN code ID or PLMN ID+CAG ID+cell ID+TAC+RAN code ID. An identifier of the terminal device may be, for example, an international mobile subscriber identification number IMSI, for example, a 5G-S-IMSI.

It should be understood that the foregoing listed specific information carried in the PDU session establishment request message sent by the terminal device to the first AMF is merely an example. The PDU session establishment request message may further include a plurality of other types of information. This is not limited in this embodiment of this application.

It should be understood that, to enable forwarding data transmission between a first access network device and a second access network device, each network element (for example, the first AMF, a second AMF, a second UPF, or the second access network device, where the first AMF is an AMF in the first network; the second AMF, the second UPF, and the second access network device are network elements in the second network) needs to configure a corresponding resource for a PDU session of the terminal device in the first network. The resource may be, for example, an IPsec tunnel.

In an implementation, the first AMF may send the PDU session establishment request message to the N3IWF. The PDU session establishment request message may be, for example, a PDU resource setup message or an initial UE context setup message. The PDU session establishment request message may carry information such as an identifier of a PDU session that is requested to be established, a DRB ID, a QFI, a cause for establishing the PDU session, a type of the PDU session, and an identifier of the terminal device. For example, a cause for establishing the PDU session may include, for example, a cross-network handover of the terminal device, cross-network cell reselection of the terminal device, and cross-network cell selection of the terminal device (for example, reselection from a cell of an SNPN to a cell of a PLMN or a PNI-NPN, that is SNPNtoPLMN or SNPNtoPNI-NPN). The type of the PDU session may be, for example, an NPN, a PLMN, an SNPN, a PNI-NPN, or an NPNto5GS. The identifier of the terminal device may be, for example, an IP address of the terminal device.

In an implementation, the N3IWF determines, based on the PDU session establishment request message sent by the first AMF, to establish the corresponding IPsec tunnel for the PDU session.

In an implementation, the terminal device, the second access network device, the second AMF, the second UPF, and the N3IWF may configure, for the terminal device, a corresponding resource of the PDU session, the QoS flow, or the DRB of the terminal device in the first network. For a specific configuration process, refer to an existing process. Details are not described herein.

S602. The terminal device sends a first message to the second access network device.

In an implementation, the first message may include location information of the first network in which the terminal device is located before the terminal device moves to the second network. The location information may be, for example, an identifier of the second network, an identifier of a re-accessed cell, a network identifier, a TAC, or an access network device identifier. When the second network is a PLMN, the location information may be PLMN ID+cell ID+TAC+RAN node ID. In addition, the first message may further carry an identifier of a terminal device, such as a 5G-S-IMSI, an IMSI, or a C-RNTI.

In an implementation, the first message may be a radio resource control (RRC) message.

S603. The second access network device sends a second request message to the first access network device.

The first access network device is an access network device in the first network, and the second access network device is an access network device in the second network. Core networks of the first network and the second network are independently deployed, and one of the first access network device in the first network and the second access network device in the second network is a shared-access network device, in other words, there is a first interface between the first access network device and the second access network device. The first interface may be configured to perform user plane data communication and control plane data communication, and the first interface may be, for example, an Xn interface.

In an implementation, the second request message is used to query about a context of the terminal device on the first access network device. When the first network is an NPN and the second network is a PLMN, the PLMN-RAN may send data forwarding request/handover request/retrieve UE context request information to an NPN shared-RAN through an Xn-C interface, to request to obtain a context of the terminal device in an NPN.

In an implementation, the second request message may include a cause why the second access network device sends the second request message to the first access network device, a movement type, an original identifier (such as a 5G-S-IMSI, an IMSI, or a C-RNTI) of the terminal device before the terminal device moves, and a new identifier of the terminal device after the terminal device moves (for example, an XnAP UE ID). The cause why the second access network device sends the second request message to the first access network device may be a cross-network handover of the terminal device, cross-network cell reselection of the terminal device, cross-network cell selection (for example, reselection from a cell of an SNPN to a cell of a PLMN or a PNI-NPN, that is, SNPNtoPLMN or SNPNtoPNI-NPN) of the terminal device, or the like. The movement type may be, for example, NPNto5GS or 5GStoNPN.

S604. The first access network device sends first indication information and first cause information to a second access network device.

In an implementation, the first access network device sends a response message to the second access network device based on the second request message received in operation S603. The response message may be, for example, a handover request/retrieve UE context response, and the response message may include a context of the terminal device. In addition, the response message may further carry an original identifier (such as a 5G-S-IMSI, an IMSI, or a C-RNTI) of the terminal device before the terminal device moves.

In an implementation, the first access network device may send first indication information and first cause information to the second access network device based on the second request message received in operation S603. The first indication information is used to indicate that the first access network device has forwarding data to be transferred to the second access network device. The first cause information is used to indicate a cause why the first access network device needs to forward data.

It should be understood that the forwarding data in this embodiment of this application may be data that is sent by the first access network device but not successfully received by the terminal device, out-of-order data that is sent by the terminal device and that is received by the first access network device, to-be-resorted data that is sent by the terminal device and that is received by the first access network device, or the like.

It should be understood that, because the first interface between the first access network device and the second access network device may be used for user plane data communication and control plane data communication, the first access network device may directly send the first indication information and the first cause information to the second access network device through the first interface.

In an implementation, the first indication information may be used to indicate whether the first access network device needs to forward data (where the indication information may be, for example, a character string Need, not Need, possible, or not possible). When the first access network device indicates that data forwarding does not need to be performed, a cause for not performing data forwarding may also be described. For example, the cause may be: done, which means that the to-be-forwarded data has been transferred; and release, which means that the to-be-forwarded data has been released and therefore cannot be forwarded.

In an implementation, the first indication information may further include at least one of the following information: a protocol data unit PDU session identifier, a quality of service QoS flow identifier, a data radio bearer DRB identifier, a mapping list between a DRB and a QoS flow, transfer status information of data in a DRB, or a data forwarding cause.

In an implementation, the first indication information may further carry indication information (for example, 0, 1, direct forwarding path is available, or direct forwarding path is not available), to indicate whether data to be forwarded by the first access network device can be directly forwarded to the second access network device through the first interface.

S605. The second access network device sends first information to the first access network device.

The first information includes transport network layer information configured by the second access network device for a data forwarding path, and the data forwarding path is configured to transferred the forwarding data.

It should be understood that, after receiving the first indication information sent by the first access network device, the second access network device determines, based on the first indication information, that the first access network device has forwarding data to be transferred to the second access network device. The second access network device configures the transport network layer information of the data forwarding path configured to transfer the forwarding data.

In an implementation, transport network layer information that is of an uplink or downlink data forwarding path and that is configured by the second access network device may include, for example, a transport layer address (for example, an IP address) and a GTP-tunnel endpoint identifier (GTP-TEID).

S606. The first access network device sends the forwarding data to the second access network device based on the first information.

In an implementation, the first access network device may send, to the second access network device through the first interface based on the transport network layer information (for example, UL/DL forwarding UP TNL information) sent by the second access network device, user plane data that needs to be forwarded.

In an implementation, the second access network device may send, to a core network, uplink data in newly arrived data and the forwarding data in the PDU session established by the terminal device in the first network, and send, to the terminal device, downlink data in the newly arrived data and the forwarding data in the PDU session.

In an implementation, if the data forwarding path is of a DRB granularity, the first access network device may further send a data sent state in the DRB to the second access network device. For example, the first access network device may send an uplink access network transmission status (uplink RAN status transfer) message to the second access network device to indicate a sending status of data, and the uplink RAN status transfer message may carry uplink packet data convergence protocol sequence number (PDCP-SN) and hyper frame number (HFN) receiver status (that is, uplink PDCP-SN and HFN receiver status) information and downlink PDCP-SN and HFN transmitter status (that is, downlink PDCP-SN and HFN transmitter status) information.

For example, the data sent state may be described by using information such as a UL/DL count value (including a UL/DL PDCP SN, an HFN for PDCP SN, and the like), a transmit status of UL PDCP SDUs (reflecting whether a UL PDCP has been successfully sent, where for example, 0 indicates that a corresponding PDCP has not been successfully sent, and 1 indicates that a corresponding PDCP has been successfully sent), or a receiver status of DL PDCP SDUs (indicating whether a DL PDCP has been successfully received, where for example, 0 indicates that a corresponding PDCP has not been successfully received, and 1 indicates that a corresponding PDCP has been successfully received).

S607. The second access network device performs PDCP numbering on the forwarding data and the newly arrived data.

In an implementation, when the data forwarding path is of a DRB granularity, the second access network device may perform, based on the data sent status information received by the first access network device, PDCP numbering and sorting on the newly arrived data and the forwarding data in the PDU session established by the terminal device in the first network; and then send the uplink data to the core network and send the downlink data to the terminal device.

It should be understood that, to enable in-order data transmission and avoid repeated data sending, the second access network device should not send any uplink data whose PDCP SN value is less than the provided UL PDCP SN value, and should use the provided DL PDCP SN value as the PDCP SN value of the to-be-sent first downlink packet for which no PDCP-SN has been assigned. In other words, after performing PDCP numbering and sorting on the newly arrived and the forwarding data, the second access network device should first send the received forwarding data to the core network or the terminal device in a sequence of numbers, and then transfer related data that is of the terminal device in the second network or the first network and that is subsequently received by the second access network device. In this way, the forwarding data of the terminal device can be transferred in a correct sequence, and repeated sending of the data is avoided.

In an example, for downlink user plane data, the second access network device may perform PDCP numbering and sorting on the received newly arrived data and the forwarding data by using a DRB, and then send the data to the terminal device. The terminal device sends the received data to a higher layer based on the PDCP SN numbers, and the higher layer parses out the user plane data.

In another example, for uplink user plane data, the second access network device may send the uplink user plane data to the first UPF or the second UPF by using an NG interface resource. If the forwarding data belongs to the first network, the second access network device may send the forwarding data to a first UPF, where the first UPF is a core network device of the first network. If the forwarding data belongs to the second network, the second access network device may send the forwarding data to the second UPF, where the second UPF is a core network device of the second network.

According to the data transmission method provided in this embodiment of this application, after the terminal device moves from a cell of the first access network device in the first network to a cell of the second access network device in the second network, the first access network device may send, to the second access network device through the first interface between the first access network device and the second access network device, indication information indicating that data forwarding needs to be performed. The second access network device configures, based on the indication information, corresponding transport network layer information for the data forwarding path required in a data forwarding process, and sends the transport network layer information to the first access network device, to set up a user plane data forwarding bearer resource between the first access network device and the second access network device, ensure service continuity of the terminal device in the first network, and implement a cross-network movement with a relatively small quantity of packet losses or even no packet loss.

Figure 13:
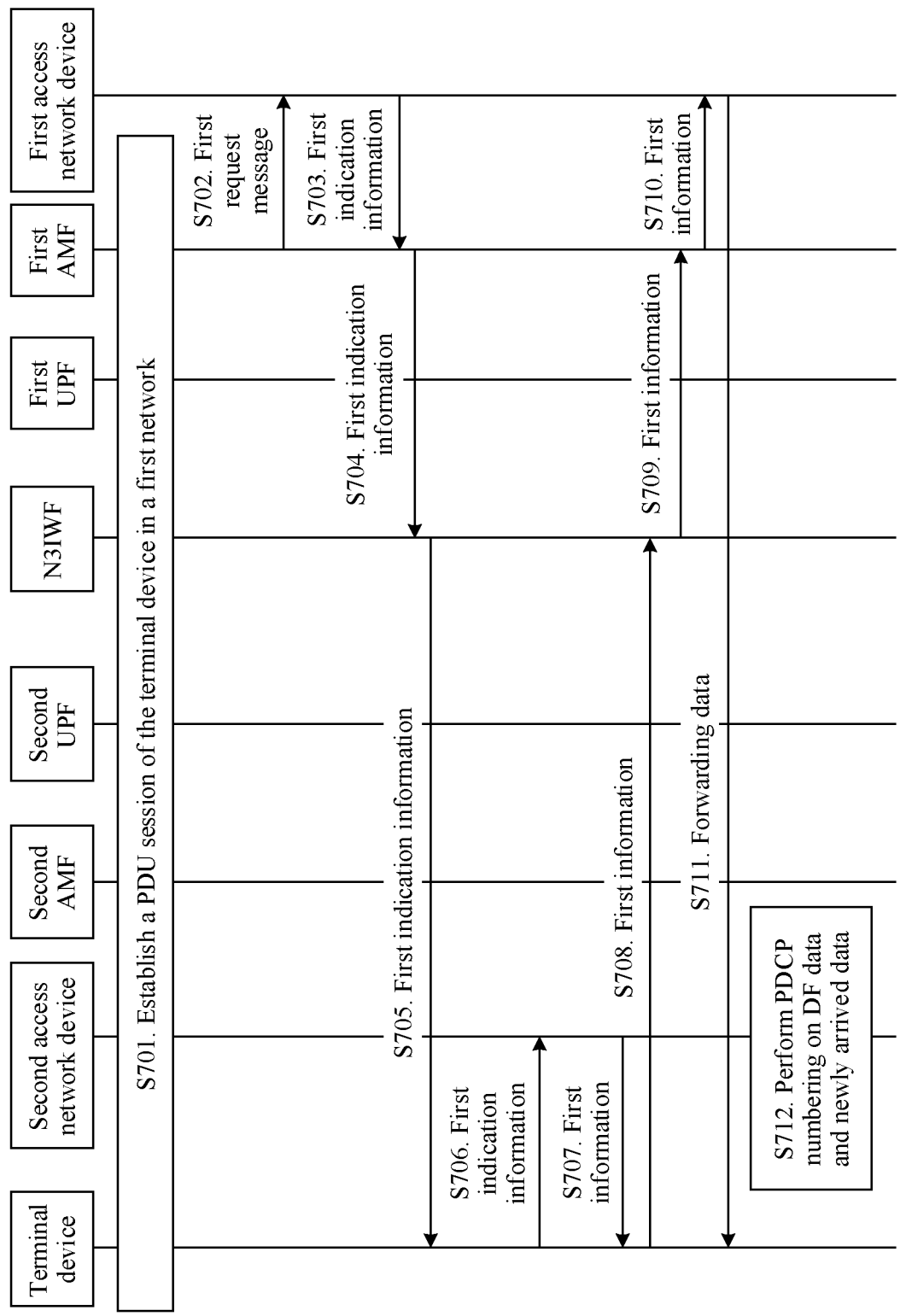
FIG. 13 is a schematic flowchart of another data transmission method according to an embodiment of this application.

FIG. 13 is a schematic flowchart of another data transmission method according to an embodiment of this application.

Figure 14:
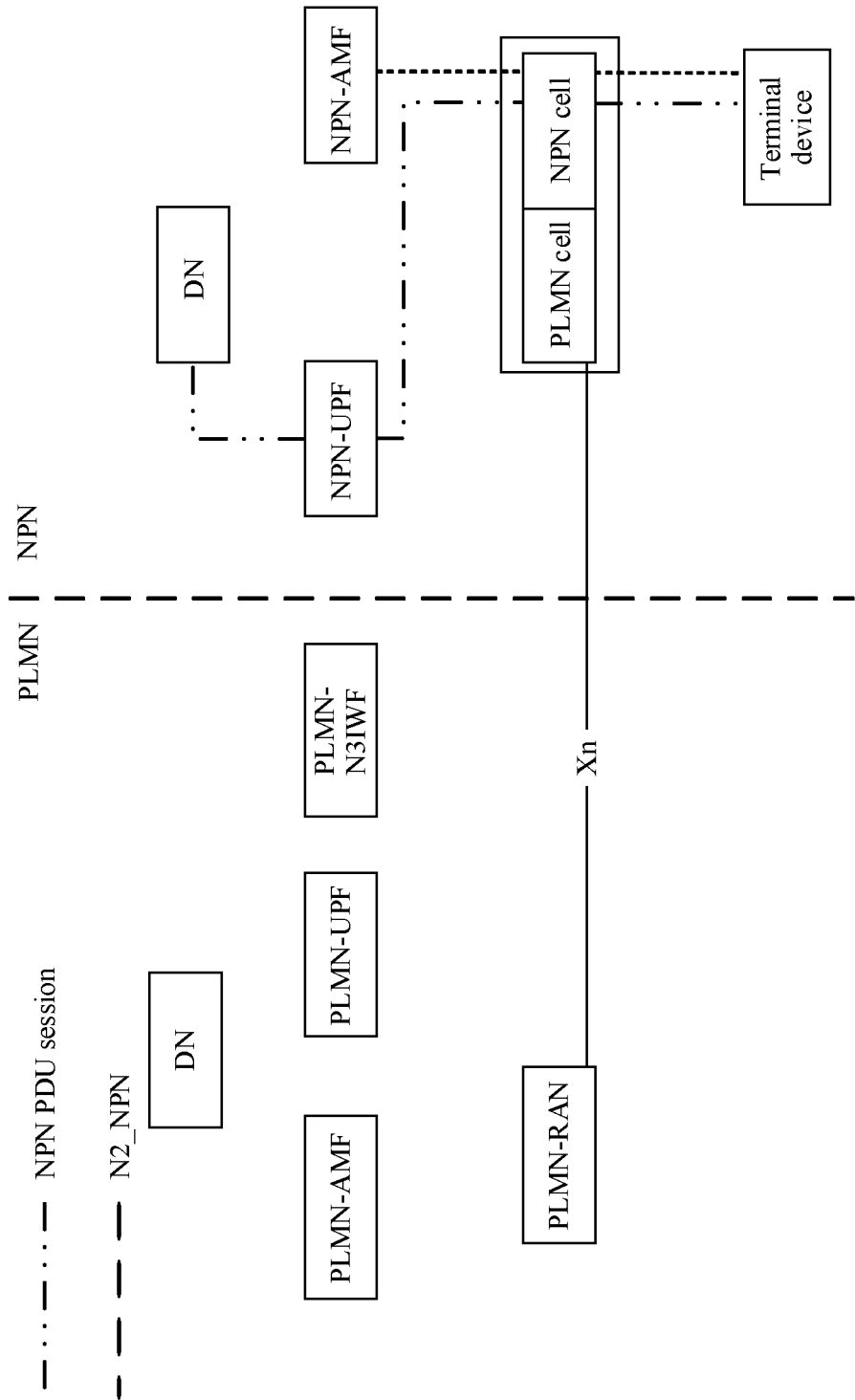
FIG. 14 is a schematic diagram of an application scenario of a data transmission method according to an embodiment of this application.
Figure 15:
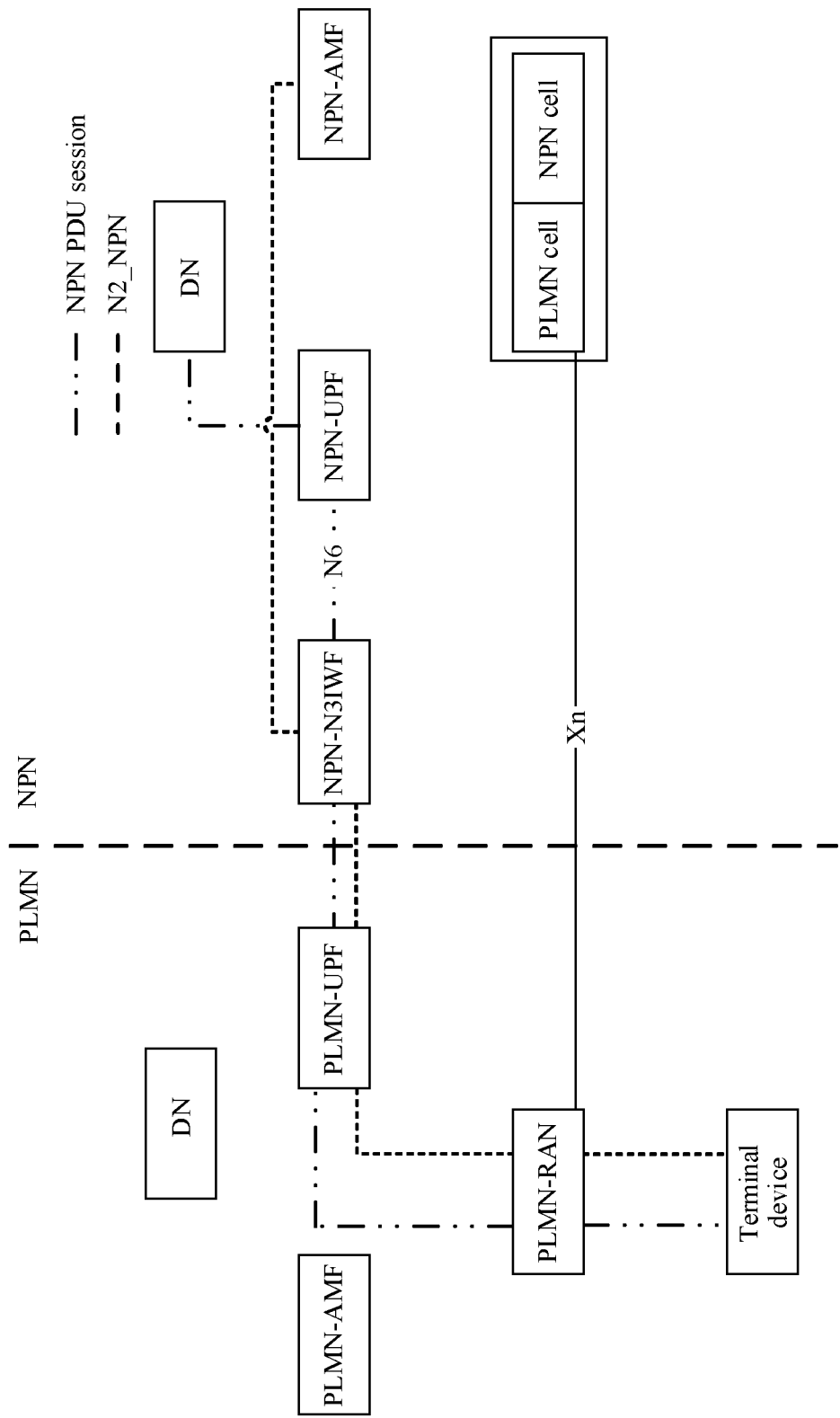
FIG. 15 is a schematic diagram of an application scenario of another data transmission method according to an embodiment of this application.

In an example, when the first network is an NPN, the second network is a PLMN, and the first access network device is a shared-access network, a specific application scenario of the data transmission method provided in this embodiment may be, for example, shown in FIG. 14 and FIG. 15: The terminal device sets up a PDU session resource in a network cell of an NPN access network device (NPN-RAN). Then, the terminal device moves to the PLMN and accesses a PLMN access network device (PLMN-RAN). The first access network device is a shared-access network device (shared-RAN), and there is a first interface between the first access network device and the second access network device. The first interface may be used for user plane data transmission, but may not be used for control plane data transmission. In this scenario, a method for implementing forwarding data transmission between the first access network device and the second access network device may be: The terminal device or the first AMF triggers data forwarding. Network elements such as the first AMF, the N3IWF, the terminal device, and the second AMF send, to the second access network device, indication information indicating that the first access network device needs to forward data. After configuring the transmission network layer information used for data forwarding, network elements such as the terminal device, the N3IWF, and the first AMF send the transmission network layer information to the first access network device, to set up a data forwarding bearer resource between the first access network device and the second access network device.

Figure 16:
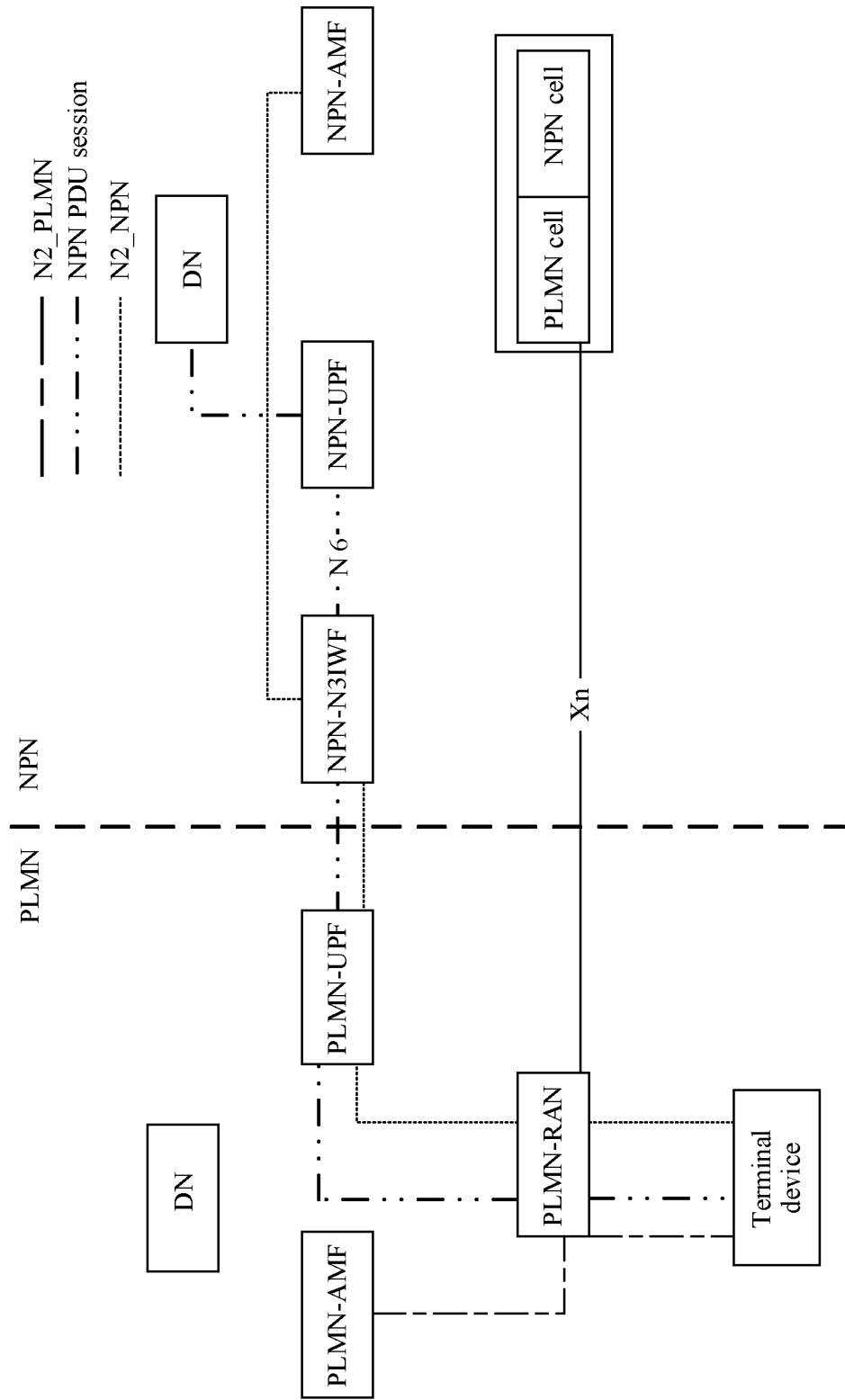
FIG. 16 is a schematic diagram of an application scenario of a data transmission method according to an embodiment of this application.
Figure 17:
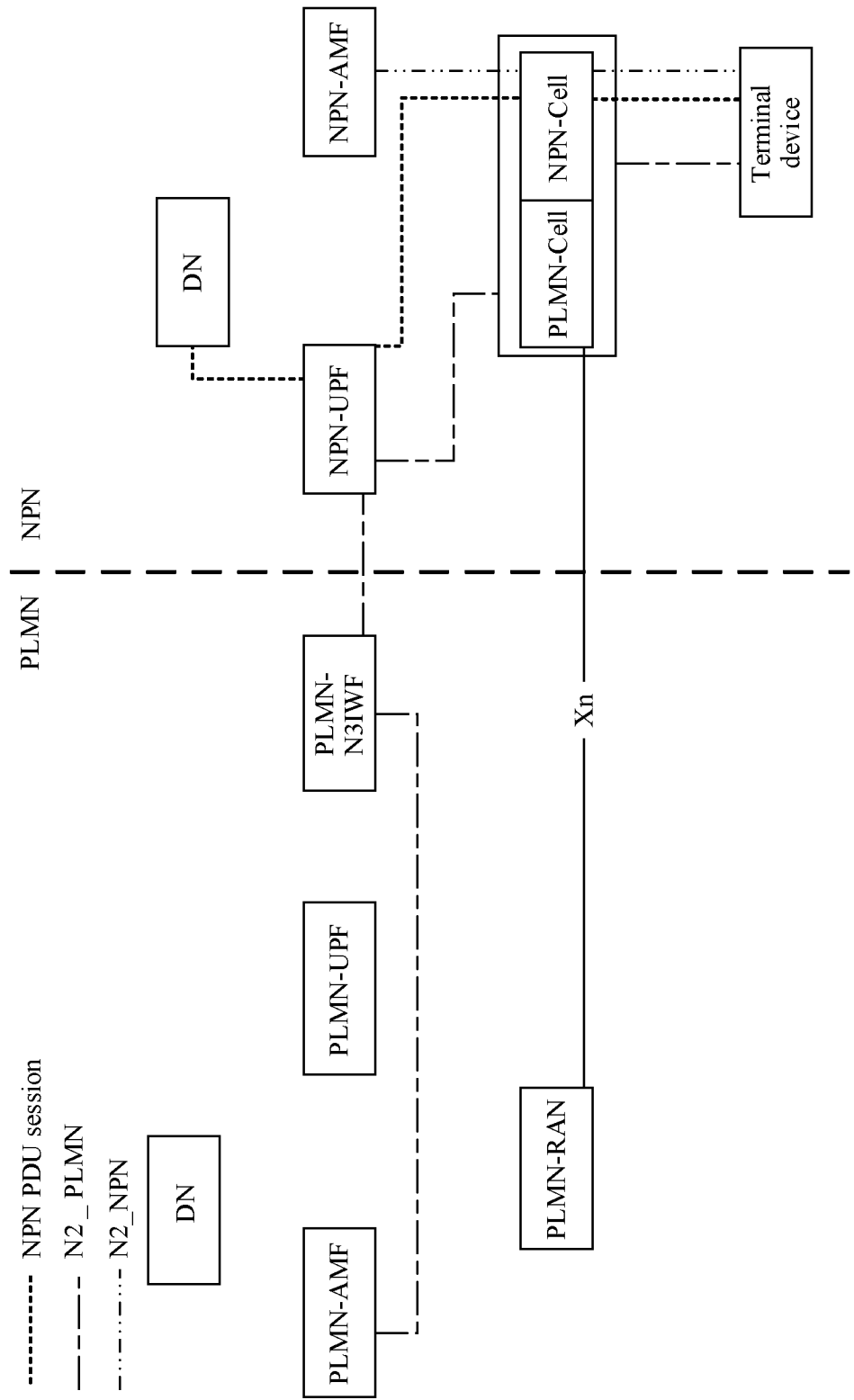
FIG. 17 is a schematic diagram of an application scenario of a data transmission method according to an embodiment of this application.

In another example, when the first network is a PLMN, the second network is an NPN, and the second access network device (NPN-RAN) is a shared-access network (shared-RAN), a specific application scenario of the data transmission method provided in this embodiment may be, for example, shown in FIG. 16 and FIG. 17: The terminal device sets up a PDU session resource in a network cell of a PLMN access network device (PLMN-RAN). Then, the terminal device moves to the NPN and accesses an NPN-RAN. There is a first interface between the first access network device and the second access network device. The first interface may be used for user plane transmission, but may not be used for control plane signaling transmission. In this scenario, a method for implementing forwarding data transmission between the first access network device and the second access network device may be: The terminal device or the first AMF triggers data forwarding. Network elements such as the first AMF, the N3IWF, the terminal device, and the second AMF send, to the second access network device, indication information indicating that the first access network device needs to forward data. After configuring the transmission network layer information used for data forwarding, network elements such as the terminal device, the N3IWF, and the first AMF send the transmission network layer information to the first access network device, to set up a data forwarding bearer resource between the first access network device and the second access network device.

It should be understood that the first interface in this embodiment of this application may be an Xn interface. The data transmission method may include the following operations.

S701. Establish a PDU session of a terminal device in a first network.

It should be understood that the terminal device may be located in the first network before the terminal device moves, and access a cell of the first network to set up a PDU session resource of the first network. When the terminal device autonomously determines to move to a cell of a second network, the terminal device needs to re-establish a PDU session with the first network to perform a subsequent data forwarding process. The terminal device first establishes an IPsec path to an N3IWF to transmit NAS signaling, and then requests a first AMF to establish the PDU session.

In an implementation, after the IPsec path is established between the terminal device and the N3IWF, the terminal device may send NAS signaling (for example, a PDU session establishment request message/an initial UE message) to the first AMF, to request to establish the PDU session in the first network. When requesting the first AMF to establish the PDU session in the first network, the terminal device may further add, to a PDU session establishment request message sent by the first AMF, a cause for establishing the PDU session, a type of the PDU session, location information of a newly accessed cell, location information of a cell of the first network in which the terminal device is located before the terminal device moves to the second network, and the like. For example, the cause for establishing the PDU session may be a cross-network handover of the terminal device or cross-network cell reselection of the terminal device (for example, reselection from a cell of an NPN to a cell of a PLMN, that is, SNPNtoPLMN) of the terminal device. The type of the PDU session may be an NPN PDU session or an NPNto5GS PDU session. The information about the new re-accessed cell may be: a network identifier of a network in which the terminal device is located after the terminal device moves, a cell identifier, an access network device identifier, and a TAC, for example, PLMN ID+cell ID+RAN Node ID+TAC. Location information of the terminal device in the first network before the terminal device moves may be: a first network identifier, a cell identifier, a tracing area code, an access network device identifier, or a closed access group identifier, for example, NID+cell ID+TAC+RAN code ID or PLMN ID+CAG ID+cell ID+TAC+RAN code ID. An identifier of the terminal device may be, for example, an international mobile subscriber identification number IMSI, for example, a 5G-S-IMSI.

It should be understood that the foregoing listed specific information carried in the PDU session establishment request message sent by the terminal device to the first AMF is merely an example. The PDU session establishment request message may further include a plurality of other types of information. This is not limited in this embodiment of this application.

It should be understood that, to enable forwarding data transmission between a first access network device and a second access network device, each network element (for example, the first AMF, a second AMF, a second UPF, or the second access network device, where the first AMF is an AMF in the first network; the second AMF, the second UPF, and the second access network device are network elements in the second network) needs to configure a corresponding resource for a PDU session in the terminal device in the first network. The resource may be, for example, an IPsec tunnel.

In an implementation, the first AMF may send the PDU session establishment request message to the N3IWF. The PDU session establishment request message may be, for example, a PDU resource setup message or an initial UE context setup message. The PDU session establishment request message may carry information such as an identifier of a PDU session that is requested to be established, a DRB ID, a QFI, a cause for establishing the PDU session, a type of the PDU session, and an identifier of the terminal device. For example, a cause for establishing the PDU session may include, for example, a cross-network handover of the terminal device, cross-network cell reselection of the terminal device, and cross-network cell selection of the terminal device (for example, reselection from a cell of an SNPN to a cell of a PLMN or a PNI-NPN, that is SNPNtoPLMN or SNPNtoPNI-NPN). The type of the PDU session may be, for example, an NPN, a PLMN, an SNPN, a PNI-NPN, or an NPNto5GS. The identifier of the terminal device may be, for example, an IP address of the terminal device.

In an implementation, the N3IWF determines, based on the PDU session establishment request message sent by the first AMF, to establish the corresponding IPsec tunnel for the PDU session.

In an implementation, the terminal device, the second access network device, the second AMF, the second UPF, and the N3IWF may configure, for the terminal device, a corresponding resource of the PDU session, the QoS flow, or the DRB of the terminal device in the first network. For a specific configuration process, refer to an existing process. Details are not described herein.

S702. The first AMF sends a first request message to a first access network device.

In an implementation, the first AMF may determine location information of the first access network device based on location information, received in operation S701, of the terminal device before the terminal device moves, and send the first request message to the first access network device based on the location information. The first request message is used to query about whether the first access network device has forwarding data.

It should be understood that the forwarding data in this embodiment of this application may be data that is sent by the first access network device but not successfully received by the terminal device, out-of-order data that is sent by the terminal device and that is received by the first access network device, to-be-resorted data that is sent by the terminal device and that is received by the first access network device, or the like.

In an implementation, the first request message may be, for example, a data forwarding request or a handover request.

In an implementation, the first request message may include location information that is of the terminal device after the terminal device moves and that is sent by the terminal device to the first AMF. In addition, the first request message may further include information such as a cause for establishing a PDU session, location information of the terminal device before the terminal device moves, an identifier of the PDU session requested to be established by the terminal device, a PDU session type, a QoS flow identifier, and an identifier of the terminal device. The cause for establishing the PDU session may be, for example, a cross-network handover of the terminal device, cross-network cell reselection of the terminal device, or cross-network cell selection (for example, reselection from a cell of an SNPN to a cell of a PLMN or a PNI-NPN, that is, SNPNtoPLMN or SNPNtoPNI-NPN) of the terminal device. The PDU session type may be an NPN or NPNto5GS. When the second network is a PLMN, the location information of the terminal device after the terminal device moves may be, for example, PLMN ID+cell ID+RAN ID+TAC. The identifier of the terminal device may be, for example, terminal device identification information such as a C-RNTI or an NG-RAN node UE NGAP ID.

S703. The first access network device sends first indication information and first cause information to the first AMF.

The first indication information is used to indicate that the first access network device has forwarding data to be transferred to the second access network device. The first cause information is used to indicate a cause why the first access network device needs to forward data.

In an implementation, the first indication information may be used to indicate whether the first access network device needs to forward data (where the indication information may be, for example, a character string Need, not Need, possible, or not possible). When the first access network device indicates that data forwarding does not need to be performed, a cause for not performing data forwarding may also be described. For example, the cause may be: done, which means that the to-be-forwarded data has been transferred; and release, which means that the to-be-forwarded data has been released and therefore cannot be forwarded.

In an implementation, the first indication information may further include at least one of the following information: a protocol data unit PDU session identifier, a quality of service QoS flow identifier, a data radio bearer DRB identifier, a mapping list between a DRB and a QoS flow, transfer status information of data in a DRB, or a data forwarding cause.

In an implementation, the first indication information may further carry indication information (for example, 0, 1, direct forwarding path is available, or direct forwarding path is not available), to indicate whether data to be forwarded by the first access network device can be directly forwarded to the second access network device through the first interface.

In an implementation, the first indication information may be included in a data forwarding response or a request acknowledge message, and the message may further carry information such as a first network PDU session identifier/a DRB identifier/a quality of service flow identifier (QFI).

In an implementation, if the data forwarding path is of a DRB granularity, the first access network device may further send a data sent state in the DRB to the second access network device. For example, the first access network device may send an uplink access network transmission status (uplink RAN status transfer) message to the second access network device to indicate a sending status of data, and the uplink RAN status transfer message may carry uplink packet data convergence protocol sequence number (PDCP-SN) and hyper frame number (HFN) receiver status (that is, uplink PDCP-SN and HFN receiver status) information and downlink PDCP-SN and HFN transmitter status (that is, downlink PDCP-SN and HFN transmitter status) information.

For example, the data sent state may be described by using information such as a UL/DL count value (including a UL/DL PDCP SN, an HFN for PDCP SN, and the like), a transmit status of UL PDCP SDUs (reflecting whether a UL PDCP has been successfully sent, where for example, 0 indicates that a corresponding PDCP has not been successfully sent, and 1 indicates that a corresponding PDCP has been successfully sent), or a receiver status of DL PDCP SDUs (indicating whether a DL PDCP has been successfully received, where for example, 0 indicates that a corresponding PDCP has not been successfully received, and 1 indicates that a corresponding PDCP has been successfully received).

S704. The first AMF sends the first indication information to the N3IWF.

In an implementation, the first indication information sent by the first AMF to the N3IWF may be included in a PDU resource setup request or an initial UE context setup message.

In an implementation, the first AMF may also send, to the N3IWF, the protocol data unit PDU session identifier, the quality of service QoS flow identifier, the data radio bearer DRB identifier, a mapping list between a DRB and a QoS flow, a transfer status information of data in a DRB, the data forwarding cause, data forwarding information related to the DRB granularity, and the like that are included in the first indication information received in operation S702.

S705. The N3IWF sends the first indication information to the terminal device.

In an implementation, the N3IWF determines, based on the information received in operation S703, to establish the IPsec tunnel for the PDU session in the terminal device in the first network.

In an implementation, first indication information sent by a first N3IWF to the terminal device may be included in an IKE_creat_SA request message. Optionally, the IKE_creat_SA request message may be used to indicate the terminal device to establish the IPsec tunnel. In addition, the IKE_creat_SA request message may further include a cause for establishing the PDU session/QoS flow/DRB resource and a type of the PDU session/QoS flow/DRB resource. If the data forwarding path performs forwarding at a DRB granularity, the N3IWF further needs to notify the terminal device of the data forwarding information related to the DRB granularity.

S706. The terminal device sends the first indication information to the second access network device.

In an implementation, the terminal device sends the first indication information to the second access network device based on the information received in operation S705. The first indication information sent by the terminal device to the second access network device may be included in a UL information transfer message.

In an implementation, the first indication information may further include at least one of the following information: a protocol data unit PDU session identifier, a quality of service QoS flow identifier, a data radio bearer DRB identifier, a mapping list between a DRB and a QoS flow, transfer status information of data in a DRB, or a data forwarding cause.

S707. The second access network device sends first information to the terminal device.

The first information includes transport network layer information configured by the second access network device for a data forwarding path, and the data forwarding path is configured to transfer the forwarding data.

It should be understood that, after receiving the first indication information sent by the terminal device, the second access network device determines, based on the first indication information, that the first access network device has forwarding data to be transferred to the second access network device. The second access network device configures the transport network layer information of the data forwarding path configured to transfer the forwarding data.

In an implementation, transport network layer information that is of an uplink or downlink data forwarding path and that is configured by the second access network device may include, for example, a transport layer address (for example, an IP address) and a GTP-tunnel endpoint identifier (GTP-TEID).

In an implementation, the second access network device may first send the first information to a second AMF. After the second AMF processes, for example, parses the first information, the second access network device sends the first information to the terminal device. For example, the second access network device sends handover request acknowledge/initial UE context setup response/PDU session resource setup response information to the second AMF, where the information carries transport network layer information (for example, UL/DL forwarding UP TNL information) of an uplink/downlink data forwarding path configured by the second access network device for the PDU session/QoS flow/DRB. The second AMF sends downlink NAS transport information to the second access network device, where the downlink NAS transport information may carry the PDU session identifier/DRB ID/QFI and corresponding UL/DL forwarding UP TNL information of the first network. Then, the second access network device forwards the downlink NAS transport information to the terminal device.

S708. The terminal device sends the first information to the N3IWF.

The first information sent by the terminal device to the N3IWF may be included in an IKE_creat_child_SA response message. The IKE_creat_child_SA response message may be used to indicate that the terminal device successfully establishes a PDU session/QoS flow/DRB bearer.

In an implementation, the IKE_creat_child_SA response message carries a UL/DL forwarding UP TNL information configured for a corresponding PDU session/QoS flow/DRB bearer for which data forwarding needs to be performed.

S709. The N3IWF sends the first information to the first AMF.

The first information sent by the N3IWF to the first AMF may be included in a PDU resource setup response/initial UE context setup response message. The PDU resource setup response/initial UE context setup response message may indicate that the N3IWF successfully establishes the PDU session/QoS flow/DRB bearer.

In an implementation, the PDU resource setup response/initial UE context setup response message carries a UL/DL forwarding UP TNL information configured for a corresponding PDU session/QoS flow/DRB bearer for which data forwarding needs to be performed.

S710. The first AMF sends the first information to the first access network device.

The first information sent by the first AMF to the first access network device may be included in a data forwarding command/handover command message. The data forwarding command/handover command message is used to indicate data forwarding path information (that is, UL/DL forwarding UP TNL information) configured by the second access network device for a corresponding PDU session/QoS flow/DRB for which data forwarding needs to be performed.

S711. The first access network device sends the forwarding data to the second access network device based on the first information.

In an implementation, the first access network device may send, to the second access network device through the first interface based on the transport network layer information (for example, UL/DL forwarding UP TNL information) sent by the second access network device, user plane data that needs to be forwarded.

In an implementation, the second access network device may send, to a core network, uplink data in newly arrived data and the forwarding data in the PDU session established by the terminal device in the first network, and send, to the terminal device, downlink data in the newly arrived data and the forwarding data in the PDU session.

In an implementation, if the data forwarding path is of a DRB granularity, the first access network device may further send a data sent state in the DRB to the second access network device. For example, the first access network device may send an uplink access network transmission status (uplink RAN status transfer) message to the second access network device to indicate a sending status of data, and the uplink RAN status transfer message may carry uplink packet data convergence protocol sequence number (PDCP-SN) and hyper frame number (HFN) receiver status (that is, uplink PDCP-SN and HFN receiver status) information and downlink PDCP-SN and HFN transmitter status (that is, downlink PDCP-SN and HFN transmitter status) information.

For example, the data sent state may be described by using information such as a UL/DL count value (including a UL/DL PDCP SN, an HFN for PDCP SN, and the like), a transmit status of UL PDCP SDUs (reflecting whether a UL PDCP has been successfully sent, where for example, 0 indicates that a corresponding PDCP has not been successfully sent, and 1 indicates that a corresponding PDCP has been successfully sent), or a receiver status of DL PDCP SDUs (indicating whether a DL PDCP has been successfully received, where for example, 0 indicates that a corresponding PDCP has not been successfully received, and 1 indicates that a corresponding PDCP has been successfully received).

S712. The second access network device performs PDCP numbering on the forwarding data and the newly arrived data.

In an implementation, when the data forwarding path is of a DRB granularity, the second access network device may perform, based on the data sent status information received by the first access network device, PDCP numbering and sorting on the newly arrived data and the forwarding data in the PDU session established by the terminal device in the first network; and then send the uplink data to the core network and send the downlink data to the terminal device.

It should be understood that, to enable in-order data transmission and avoid repeated data sending, the second access network device should not send any uplink data whose PDCP SN value is less than the provided UL PDCP SN value, and should use the provided DL PDCP SN value as the PDCP SN value of the to-be-sent first downlink packet for which no PDCP-SN has been assigned. In other words, after performing PDCP numbering and sorting on the newly arrived and the forwarding data, the second access network device should first send the received forwarding data to the core network or the terminal device in a sequence of numbers, and then send related data that is of the terminal device in the second network or the first network and that is subsequently received by the second access network device.

In this way, the forwarding data of the terminal device can be transferred in a correct sequence, and repeated sending of the data is avoided.

In an example, for downlink user plane data, the second access network device may perform PDCP numbering and sorting on the received newly arrived data and the forwarding data by using a DRB, and then send the data to the terminal device. The terminal device sends the received data to a higher layer based on the PDCP SN numbers, and the higher layer parses out the user plane data.

In another example, for uplink user plane data, the second access network device may send the uplink user plane data to the first UPF or the second UPF by using an NG interface resource. If the forwarding data belongs to the first network, the second access network device may send the forwarding data to a first UPF, where the first UPF is a core network device of the first network. If the forwarding data belongs to the second network, the second access network device may send the forwarding data to the second UPF, where the second UPF is a core network device of the second network.

According to the data transmission method provided in this embodiment of this application, after the terminal device autonomously moves from a cell of the first access network device in the first network to a cell of the second access network device in the second network, the first access network device sends, to the second access network device, indication information indicating that data forwarding needs to be performed. The second access network device configures, based on the indication information, corresponding transport network layer information for the data forwarding path required in a data forwarding process, and sends the transport network layer information to the first access network device, to set up a user plane data forwarding bearer resource between the first access network device and the second access network device, ensure service continuity of the terminal device in the first network, and implement a cross-network movement with a relatively small quantity of packet losses or even no packet loss.

An embodiment of this application further provides a communications system for data transmission. The communications system includes at least one first access network device, a second access network device, and a first AMF. The first access network device, the second access network device, and the first AMF are configured to perform the method provided in the foregoing embodiments of this application.

Figure 18:
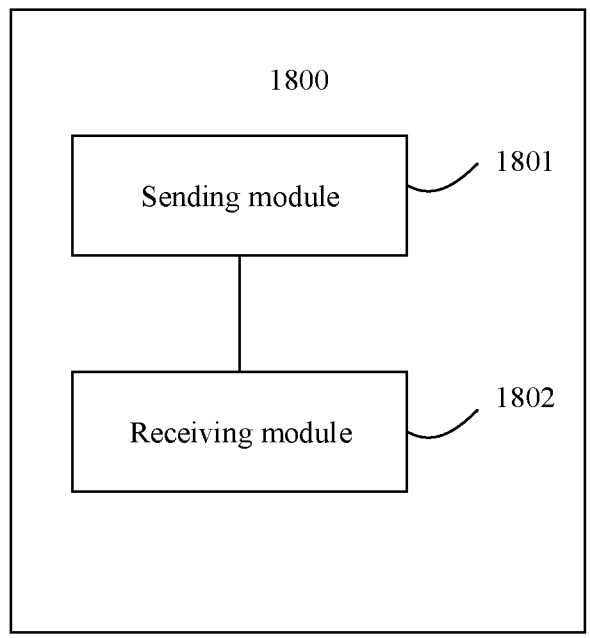
FIG. 18 is a schematic structural diagram of an access network device according to an embodiment of this application.

FIG. 18 is a schematic structural diagram of an access network device according to an embodiment of this application. The access network device 1800 includes a sending module 1801 and a receiving module 1802.

In an implementation, the sending module 1801 may be configured to send first indication information and first cause information to a second access network device, where the first indication information is used to indicate that the first access network device has forwarding data to be transferred to the second access network device, the first cause information is used to indicate a cause why the first access network device needs to forward data, the forwarding data is data that is sent by the first access network device but not successfully received by a terminal device, out-of-order data that is sent by the terminal device and that is received by the first access network device, or to-be-resorted data that is sent by the terminal device and that is received by the first access network device, one of the first access network device and the second access network device is an access network device shared by a first network and a second network, the first access network device and the second access network device respectively belong to the first network and the second network, core network elements of the first network and the second network are independently deployed, there is a first interface between the first access network device and the second access network device, and the first interface is configured to perform user plane data communication and control plane data communication.

In an implementation, the receiving module 1802 may be configured to receive first information sent by the second access network device, where the first information includes transport network layer information configured by the second access network device for a data forwarding path, and the data forwarding path is configured to transfer the forwarding data.

In an implementation, the sending module 1801 may further be configured to send the forwarding data to the second access network device.

In an implementation, the receiving module 1802 may further be configured to receive a first request message sent by a first access and mobility management function network element AMF, where the first request message is used to query about whether the first access network device has the forwarding data, and the first AMF is an AMF in the first network.

In an implementation, the sending module 1801 may further be configured to send first indication information to the second access network device based on the first request message.

In an implementation, the receiving module 1802 may further be configured to receive a second request message sent by the second access network device, where the second request message is used to query about a context of the terminal device on the first access network device.

In an implementation, the sending module 1801 may further be configured to send first indication information to the second access network device based on the second request message.

For example, the first network is a standalone non-public network SNPN, and the second network is a public land mobile network PLMN; the first network is a PLMN, and the second network is an SNPN; the first network is a public network integrated non-public network PNI-NPN, and the second network is an SNPN; or the first network is an SNPN, and the second network is a PNI-NPN.

In an implementation, the sending module 1801 may send the forwarding data to the second access network device through the first interface.

In an implementation, the first request message and the second request message may include at least one of the following information: a cause for sending the first request message, location information of the terminal device after the terminal device moves, location information of the terminal device before the terminal device moves, a PDU session identifier, a PDU session type, a QoS flow identifier, or an identifier of the terminal device.

In an implementation, the first indication information may include at least one of the following information: a protocol data unit PDU session identifier, a quality of service QoS flow identifier, a data radio bearer DRB identifier, a mapping list between a DRB and a QoS flow, transfer status information of data in a DRB, or a data forwarding cause.

In an implementation, the first indication information is further used to indicate that the forwarding data can be forwarded by the first access network device to the second access network device through the first interface.

Figure 19:
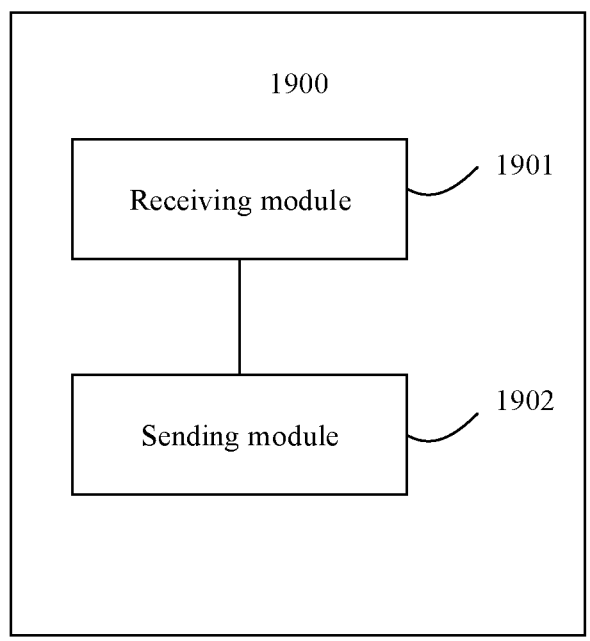
FIG. 19 is a schematic structural diagram of another access network device according to an embodiment of this application.

FIG. 19 is a schematic structural diagram of another access network device according to an embodiment of this application. The access network device 1900 includes a receiving module 1901 and a sending module 1902.

In an implementation, the receiving module 1901 may be configured to receive first indication information and first cause information that are sent by a first access network device, where the first indication information is used to indicate that the first access network device has forwarding data to be transferred to the second access network device, the first cause information is used to indicate a cause why the first access network device needs to forward data, the forwarding data is data that is sent by the first access network device but not successfully received by a terminal device, out-of-order data that is sent by the terminal device and that is received by the first access network device, or to-be-resorted data that is sent by the terminal device and that is received by the first access network device, one of the first access network device and the second access network device is an access network device shared by a first network and a second network, the first access network device and the second access network device respectively belong to the first network and the second network, core network elements of the first network and the second network are independently deployed, there is a first interface between the first access network device and the second access network device, and the first interface is configured to perform user plane data communication and control plane data communication.

In an implementation, the sending module 1902 may be configured to send first information to the first access network device based on the first indication information, where the first information is transport network layer information configured by the second access network device for a data forwarding path, and the data forwarding path is used to transfer the forwarding data.

In an implementation, the receiving module 1901 may further be configured to receive the forwarding data sent by the first access network device.

In an implementation, the receiving module 1901 may further be configured to receive a first message sent by the terminal device, where the first message is used to indicate location information of the first network in which the terminal device is located before the terminal device moves to the second network.

In an implementation, the sending module 1902 may further be configured to send a second request message to the first access network device based on the first message, where the second request message is used to query about a context of the terminal device on the first access network device.

In an implementation, the sending module 1902 may further be configured to directly send the first information to the first access network device through the first interface.

In an implementation, the second request message may further include at least one of the following information: a cause for sending the first request message, location information of the terminal device after the terminal device moves, location information of the terminal device before the terminal device moves, a PDU session identifier, a PDU session type, a QoS flow identifier, or an identifier of the terminal device.

In an implementation, the first network is an SNPN, and the second network is a PLMN; the first network is a PLMN, and the second network is an SNPN; the first network is a PNI-NPN, and the second network is an SNPN; or the first network is an SNPN, and the second network is a PNI-NPN.

In an implementation, the first indication information includes at least one of the following information: a protocol data unit PDU session identifier, a quality of service QoS flow identifier, a data radio bearer DRB identifier, a mapping list between a DRB and a QoS flow, transfer status information of data in a DRB, or a data forwarding cause.

Figure 20:
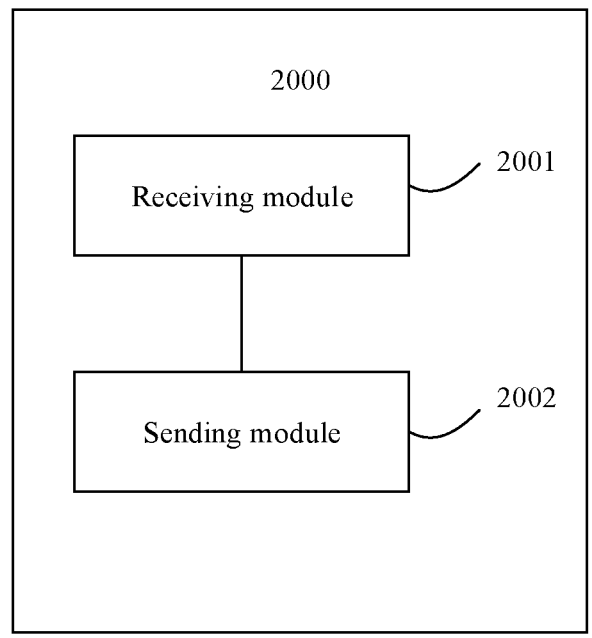
FIG. 20 is a schematic structural diagram of an AMF according to an embodiment of this application.

FIG. 20 is a schematic structural diagram of an AMF according to an embodiment of this application. The AMF 2000 includes a receiving module 2001 and a sending module 2002.

In an implementation, the receiving module 2001 may be configured to receive a second message sent by a terminal device, where the second message includes location information of a first network in which the terminal device is located before the terminal device moves and location information of a second network in which the terminal device is located after the terminal device moves, and core network elements of the first network and the second network are independently deployed.

In an implementation, the sending module 2002 may be configured to send a first request message to a first access network device based on the second message, where the first request message is used to query about whether the first access network device has forwarding data, the forwarding data is data that is sent by the first access network device but not successfully received by the terminal device, out-of-order data that is sent by the terminal device and that is received by the first access network device, or to-be-resorted data that is sent by the terminal device and that is received by the first access network device, and the first access network device is an access network device in the first network.

In an implementation, the first network is an SNPN, and the second network is a PLMN; the first network is a PLMN, and the second network is an SNPN; the first network is a PNI-NPN, and the second network is an SNPN; or the first network is an SNPN, and the second network is a PNI-NPN.

In an implementation, the first request message includes at least one of the following information: a cause for sending the first request message, location information of the terminal device after the terminal device moves, location information of the terminal device before the terminal device moves, a PDU session identifier, a PDU session type, a QoS flow identifier, or an identifier of the terminal device.

In an implementation, the second message further includes at least one of the following information: a cause why the terminal device sends the second message to the first AMF, location information of the terminal device after the terminal device moves, location information of the terminal device before the terminal device moves, the PDU session identifier, a cause for establishing a PDU session in the first network, a type of the PDU session in the first network, or the identifier of the terminal device.

Figure 21:
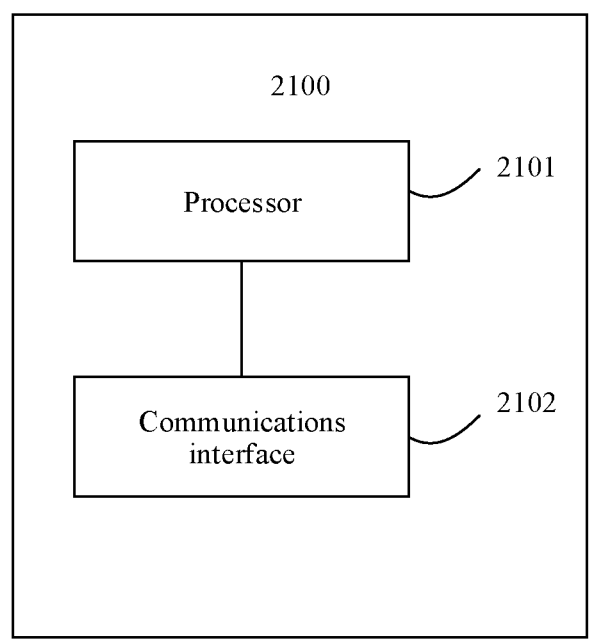
FIG. 21 is a schematic structural diagram of a communications device according to an embodiment of this application.

FIG. 21 is a schematic structural diagram of a communications device for data transmission according to an embodiment of this application.

The communications device 2100 includes at least one processor 2101 and a communications interface 2102. The communications interface 2102 is configured to exchange information between the communications apparatus and another communications apparatus. When program instructions are executed in the at least one processor, the communications device is enabled to implement the methods provided in the foregoing embodiments of this application. The communications device may be a network element such as the first access network device, the second access network device, or the first AMF in the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the apparatus embodiments described above are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions in the embodiments.

In addition, the functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing describes merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system information validity verification method applied to a communications apparatus, comprising:
receiving first system information broadcast by a radio access network device, the first system information including a non-public network (NPN) identification information list and first association information, the NPN identification information list including a first of NPN identification information; and
determining second system information is valid when the first NPN identification information in the NPN identification information list is identical to second NPN identification information stored in the communications apparatus, and the first association information is identical to second association information stored in the communications apparatus, the second system information including the second NPN identification information and the second association information.

2. The method according to claim 1, wherein the first NPN identification information comprises a public land mobile network (PLMN) identifier (ID) and a network ID (NID).

3. The method according to claim 1, wherein the first NPN identification information comprises a PLMN ID and a closed access group (CAG) ID.

4. The method according to claim 1, wherein the first association information and the second association information each include at least one of the following items: area scope, or system information area ID, or value tag, or cell identity.

5. A communications apparatus, comprising:
a communications interface; and
at least one processor coupled to one or more memories storing programming instructions for execution by the at least one processor to perform operations including:
receiving first system information broadcast by a radio access network device, the first system information including a non-public network (NPN) identification information list and first association information, the NPN identification information list including a first of NPN identification information; and
determining second system information is valid when the first NPN identification information in the NPN identification information list is identical to second NPN identification information stored in the communications apparatus, and the first association information is identical to second association information stored in the communications apparatus, the second system information including the second NPN identification information and the second association information.

6. The communications apparatus according to claim 5, wherein the first NPN identification information comprises a public land mobile network (PLMN) identifier (ID) and a network ID (NID).

7. The communications apparatus according to claim 5, wherein the first NPN identification information comprises a PLMN ID and a closed access group (CAG) ID.

8. The communications apparatus according to claim 5, wherein the first association information and the second association information comprise at least one of the following items: area scope, or system information area ID, or value tag, or cell identity.

9. A non-transitory computer-readable storage medium storing computer instructions that are configured, when executed by one or more processors of a communications apparatus, to cause the communications apparatus to perform operations comprising:
receiving first system information broadcast by a radio access network device, the first system information including a non-public network (NPN) identification information list and first association information, the NPN identification information list including a first of NPN identification information; and
determining second system information is valid when the first NPN identification information in the NPN identification information list is identical to second NPN identification information stored in the communications apparatus, the first association information being identical to second association information stored in the communications apparatus, the second system information including the second NPN identification information and the second association information.

10. The non-transitory computer-readable storage medium according to claim 9, wherein the first NPN identification information comprises a public land mobile network (PLMN) identifier (ID) and a network ID (NID).

11. The non-transitory computer-readable storage medium according to claim 9, wherein the first NPN identification information comprises a PLMN ID and a closed access group (CAG) ID.

12. The non-transitory computer-readable storage medium according to claim 9, wherein the first association information and the second association information comprise at least one of the following items: area scope, or system information area ID, or value tag, or cell identity.

* * * * *